(12) United States Patent
Takashima

(10) Patent No.: US 8,516,600 B2
(45) Date of Patent: *Aug. 20, 2013

(54) INFORMATION PROCESSING DEVICE, INFORMATION RECORDING MEDIUM, INFORMATION PROCESSING METHOD, AND COMPUTER PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,546

(22) Filed: Sep. 23, 2011

(65) Prior Publication Data

US 2012/0017283 A1    Jan. 19, 2012

Related U.S. Application Data

(63) Continuation of application No. 11/508,953, filed on Aug. 24, 2006, now Pat. No. 8,046,837.

(60) Provisional application No. 60/724,780, filed on Oct. 11, 2005.

(30) Foreign Application Priority Data

Aug. 26, 2005    (JP) ................................ P2005-245943

(51) Int. Cl.
    *G06F 21/00*    (2013.01)
(52) U.S. Cl.
    USPC ............. 726/26; 386/252; 386/253; 386/254; 386/255; 386/257; 380/200; 380/201; 380/202; 713/189; 713/193; 714/45; 714/48; 714/49; 714/50; 714/52

(58) Field of Classification Search
    USPC ........... 713/189, 193; 380/200–202; 714/45, 714/48–50, 52
    See application file for complete search history.

(56) References Cited

U.S. PATENT DOCUMENTS 6,044,157 A  *  3/2000  Uesaka et al. ................ 380/201
6,104,860 A     8/2000  Lee et al.
(Continued)

FOREIGN PATENT DOCUMENTS

JP    63-168732    7/1988
JP     6-44026     2/1994
(Continued)

OTHER PUBLICATIONS

Michael et al, A Web-Based Game for Collecting Music Metadata, 2008, Journal of new Music Research, vol. 37, No. 2.*

(Continued)

*Primary Examiner* — Taghi Arani
*Assistant Examiner* — Josnel Jeudy
(74) *Attorney, Agent, or Firm* — Oblon, Spivak, McClelland, Maier & Neustadt, L.L.P.

(57) ABSTRACT

An information processing device, for executing content reproduction processing from an information recording medium, includes a security information processing unit for determining output messages based on security check information in a content reproduction sequence, and outputting a message output command accompanied by selection information of the output message to a user interface processing unit, and a user information processing unit for obtaining message information based on the selection information input from said security information processing unit and outputting to a display unit.

17 Claims, 28 Drawing Sheets

(56) References Cited

U.S. PATENT DOCUMENTS

| | | |
|---|---|---|
| 6,938,162 B1 | 8/2005 | Nagai et al. |
| 7,469,346 B2 | 12/2008 | Watson |
| 8,356,355 B2 * | 1/2013 | Holzapfel et al. ............ 726/26 |
| 2002/0154779 A1 | 10/2002 | Asano et al. |
| 2005/0027871 A1 | 2/2005 | Bradley et al. |
| 2005/0265164 A1 | 12/2005 | Koshino |
| 2006/0212720 A1 * | 9/2006 | Sutardja ..................... 713/193 |

FOREIGN PATENT DOCUMENTS

| | | |
|---|---|---|
| JP | 10-41934 | 2/1998 |
| JP | 2000-163803 | 6/2000 |
| JP | 2001-285820 A5 | 10/2001 |
| JP | 2001-518661 | 10/2001 |
| JP | 2002-251240 | 9/2002 |
| JP | 2002-344623 | 11/2002 |
| JP | 2007-526526 | 9/2007 |
| WO | WO 2005/001666 | 1/2005 |
| WO | WO 2007/000987 A1 | 1/2007 |

OTHER PUBLICATIONS

Office Action issued Nov. 15, 2011 in Japan Application No. 2010-036638 (With English Translation).

Office Action issued Nov. 15, 2011 in Japan Application No. 2010-293726 (With English Translation).

* cited by examiner

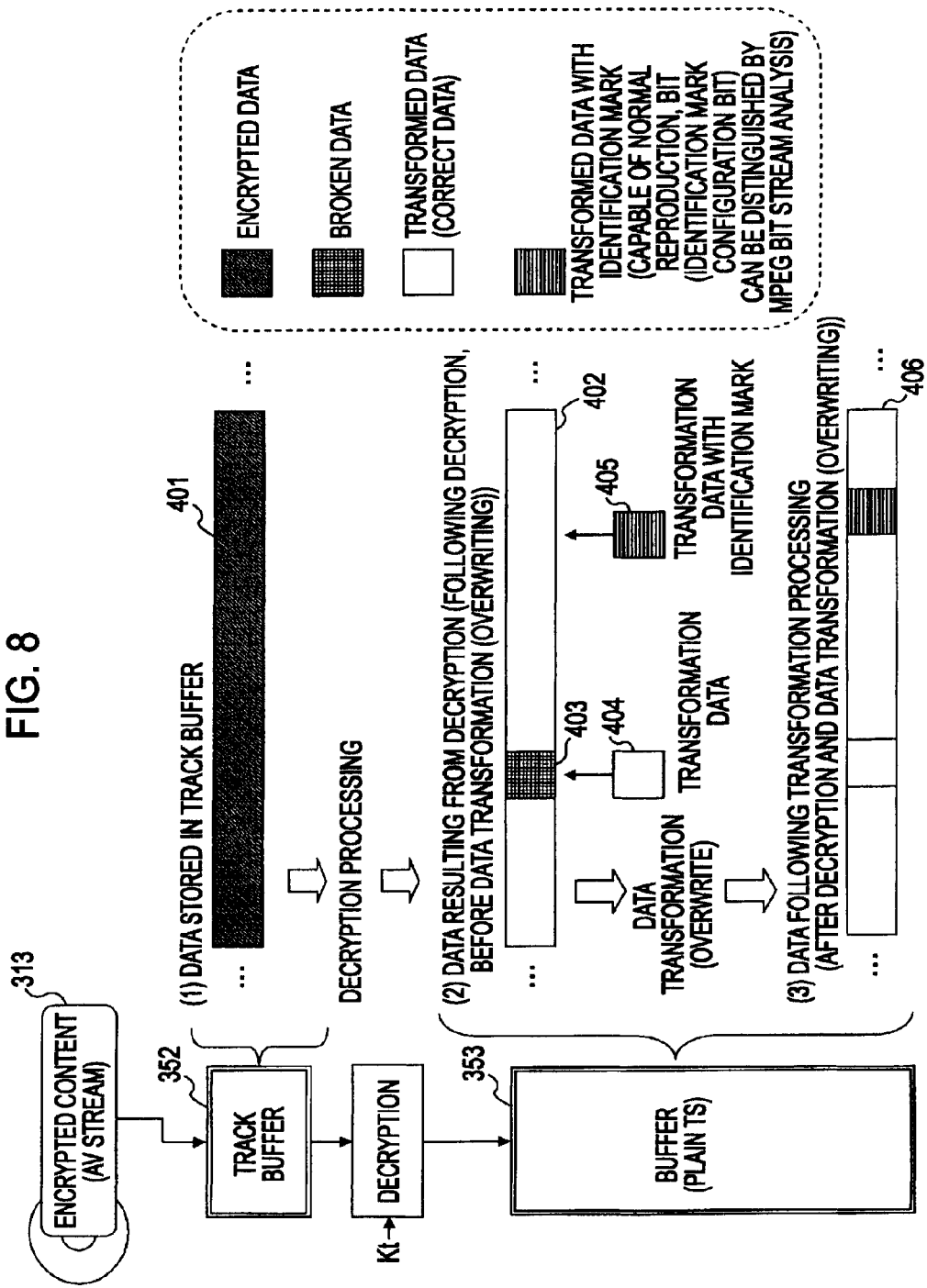

FIG. 9

| FixUpTable() { | BITS | DESCRIPTION (DESCRIPTION) |
|---|---|---|
| NUMBER OF FixUpEntry | 32 | NUMBER OF TRANSFORMATION DATA ENTRIES (NUMBER OF FixUpEntry) |
| FixUpEntry LENGTH | 8 | NUMBER OF BYTES IN EACH TRANSFORMATION DATA ENTRY (BYTE LENGTH OF ONE FixEntry()  =(N+6)) |
| RESERVED | 8 | RESERVED |
| FixUpEntry(){ | | |
| SPN | 32 | SOURCE PACKET NUMBER: PACKET NUMBER FOR START POSITION IN AV STREAM FILE OF TRANSFORMATION DATA WRITTEN PACKET (ABSOLUTE TRANSFORMED PACKET NUMBER FROM THE BEGINNING OF AV STREAM FILE) |
| BYTE OFFSET | 8 | BYTE OFFSET INDICATING TRANSFORMATION DATA WRITE START POSITION IN PACKET (START BYTE POSITION OF TRANSFORMED DATA IN THE PACKET) |
| player_id_bit_ position | 8 | BIT POSITION OF IDENTIFICATION MARK (PLAYER ID) (INDICATE BIT POSITION OF PLAYER ID FOR FORENSIC) |
| FixUp DATA | 8×N | TRANSFORMATION OVERWRITE DATA (VALUE TO BE OVERWRITTEN (N BYTE IS TRANSFORMED IN ONE TS PACKET)) |
| } | | |

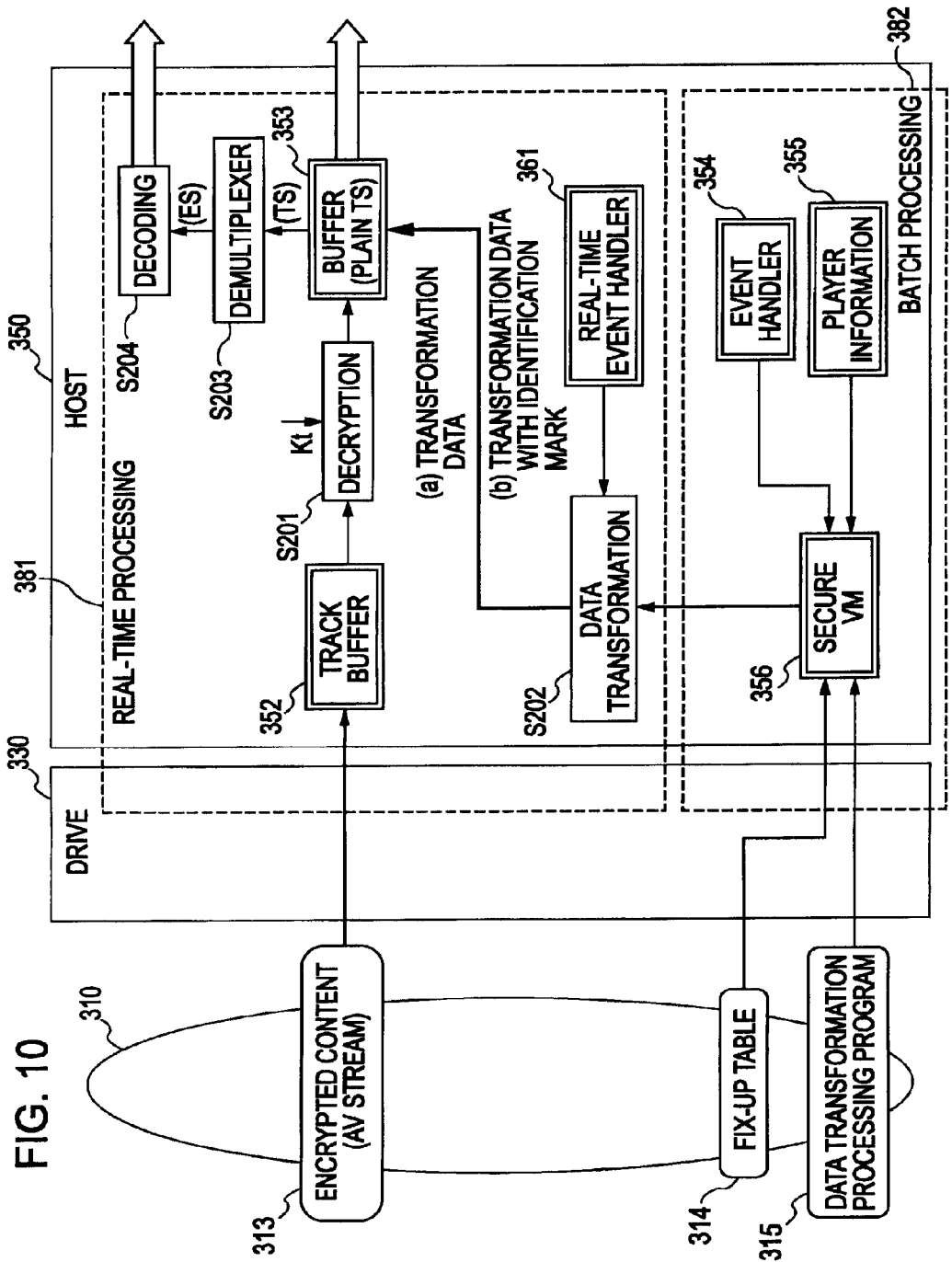

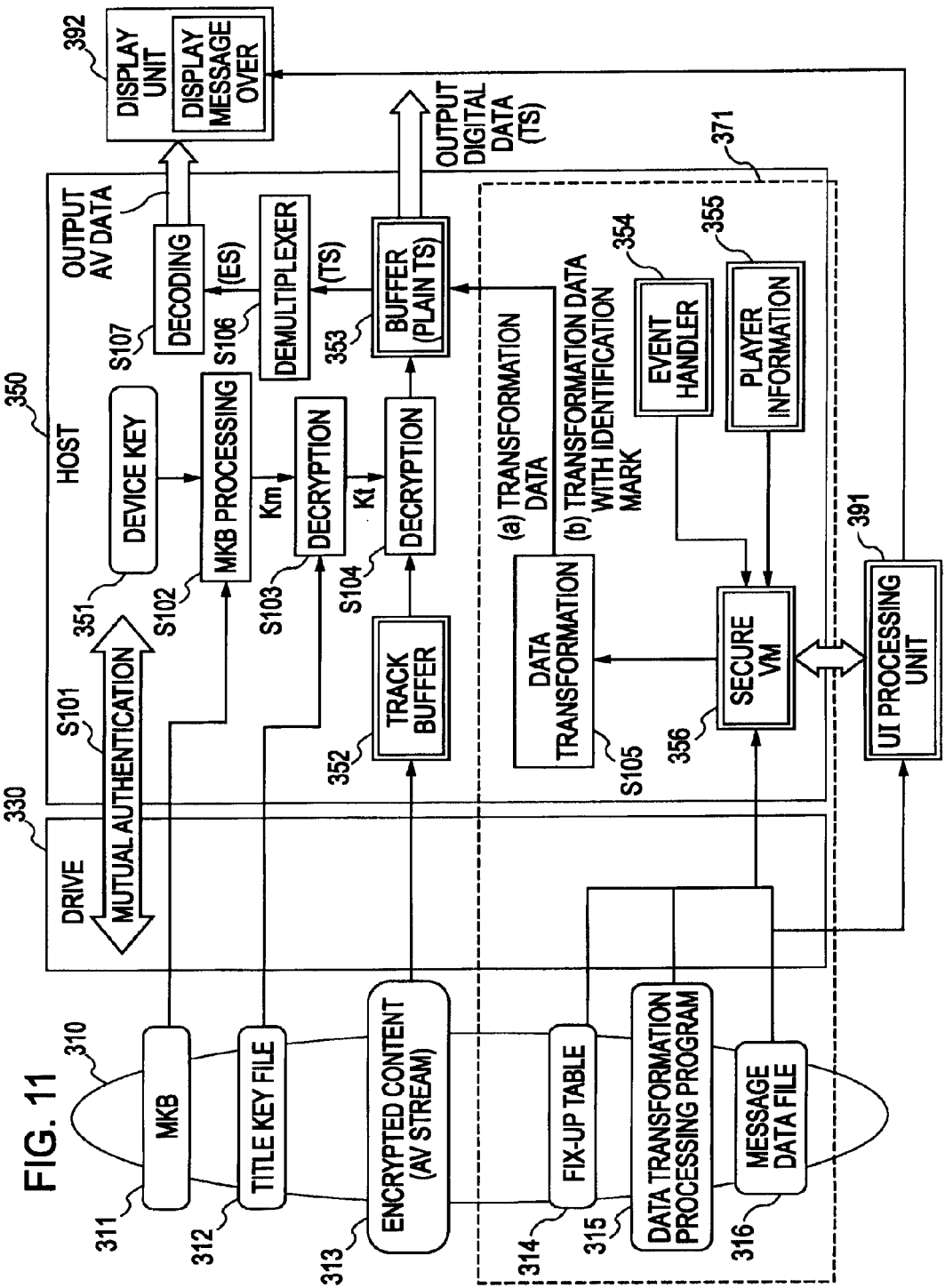

US 8,516,600 B2

INFORMATION PROCESSING DEVICE, INFORMATION RECORDING MEDIUM, INFORMATION PROCESSING METHOD, AND COMPUTER PROGRAM

CROSS REFERENCES TO RELATED APPLICATIONS

This application is a continuation application of and claims the benefit of priority under 35 U.S.C. §120 from U.S. application Ser. No. 11/508,953, filed Aug. 24, 2006, the entire contents of which are incorporated herein by reference. U.S. application Ser. No. 11/508,953 is related to and claims the benefit of priority under 35 U.S.C. §119(e) from U.S. Provisional Patent Application No. 60/724,780, filed Oct. 11, 2005, and contains subject matter related to Japanese Patent Application 2005-245943 filed on Aug. 26, 2005, the entire contents of each of which are incorporated herein by reference.

BACKGROUND OF THE INVENTION

1. Field of the Invention

The present invention relates to an information processing device, an information recording medium, an information processing method, and a computer program. More specifically, the present invention relates to an information processing device, an information recording medium, an information processing method, and a computer program, wherein unauthorized content usage is eliminated by data transformation processing performed on various contents regarding which content usage management is requested, thereby realizing strict content usage management, and further enabling displaying of messages such as the usage suspension state of contents, and user confirmation.

2. Description of the Related Art

Various types of software data, such as audio data like music and so forth, image data like movies and so forth, game programs, various types of application programs and so forth (hereafter referred to as "content") can be stored as digital data in recording media, for example, Blu-ray disks which employ blue laser, or DVD (Digital Versatile Disc), MD (Mini Disc), and CD (Compact Disc). In particular, Blu-ray disks which employ blue laser are high-density recording-capable disks, and can record massive amounts of picture contents and the like as high-image-quality data.

Digital content is stored in such various types of information recording mediums (recording media) so as to be provided to users. Users reproduce and use the content on a reproduction device such as a PC (Personal Computer), disk player, etc., owned by the user.

Generally, the distribution right and so forth of many contents such as music data, image data, and so forth, is held by the creator or vendor thereof. Accordingly, at the time of distribution of content, an arrangement is normally implemented wherein certain restrictions on usage are laid down, i.e., usage of content is permitted only for authorized users, and unauthorized reproduction and the like is prevented.

With digital recording devices and recording media, recording and reproduction can be repeated without deterioration in image or audio for example, and problems are occurring such as distribution of illegally copied contents over the Internet, distribution of so-called bootleg edition disks of contents copied onto CD-Rs or the like, usage of copied contents stored on hard disks of PCs and the like, in proliferation.

Large-capacity recording media such as DVDs, recording media using blue laser which have been developed in recent years, and so forth, are capable of recording great amounts of data, e.g., one to several movies, as digital information on a single disk. The ability to record picture information and the like as digital information makes preventing unauthorized copies to protect copyright holders an even more important issue. Various techniques have been implemented as of recent for preventing unauthorized copying to digital recording devices and recording media, in order to prevent such unauthorized copying of digital data.

For example, with DVD players, the Content Scramble System is employed. With the content scramble system, in a configuration wherein video data, audio data, etc., is recorded in a DVD-ROM (Read Only Memory) for example, in an encrypted form, the content can be reproduced by descrambling the scrambling.

Descrambling processing requires processing to be executed which applies particular data such as a key provided to a licensed DVD player, or the like. Licenses are provided to DVD players designed so as to follow predetermined operating rules, such as not making unauthorized copies, and so forth. Accordingly, with a licensed DVD player, descrambling the data recorded in the DVD-ROM using the particular data such as a key provided thereto enables the images and audio to be reproduced from the DVD-ROM.

On the other hand, unlicensed DVD players do not have the particular data such as a key to be applied to descrambling of the data which has been subjected to scrambling processing, and accordingly cannot reproduce the data recorded in the DVD-ROM. Thus, with the content scramble system configuration, DVD players which do not satisfy conditions required at the time of licensing cannot reproduce DVD-ROMs storing digital data, thereby preventing unauthorized copying.

SUMMARY OF THE INVENTION

However, such content scramble systems have the problem that the processing load on the information processing device side serving as a user device which executes the reproduction processing is great. Also, there are a great number of already-existing scramble systems regarding which the descrambling mechanisms have been deciphered and the deciphering method is being circulated via communication media such as the Internet. In this way, once the scrambling mechanisms are deciphered, content is reproduced and duplicated in an unauthorized manner, causing the problems of invasion of copyrights and usage rights of contents.

Configurations for forbidding reproduction by users and reproducing devices without proper content usage rights are being proposed besides the scrambling technique, by way of various content protecting techniques. For example, Japanese Unexamined Patent Application Publication No. 10-41934 discloses technology for adding encryption algorithms by executing a program for deciphering encrypted data using a virtual machine. However, in reality, in the event that content reproduction is not performed under such a content protection mechanism, the user cannot obtain the reason why the content cannot be reproduced or a solution on how to use the content, so the configuration is insufficient to meet demands of users who would desire to obtain proper rights and use the content.

Also, there is the problem that content protection mechanisms as they have been up to now have often been configurations for protecting mainly large-size content such as certain movies, in the form of AV streams, and protection of small-size content other than movies and the like, such as content processed by programs such as Java (registered trademark) for example, has not been taken into consideration very much.

Accordingly, it has been found desirable to provide an information processing device, an information recording medium, an information processing method, and a computer program, wherein, in the event that content reproduction is not performed based on a content protection mechanism, the user can be presented with the status, presented with solving methods, and user confirmation can be made. It is also desirable to provide an information processing device, an information recording medium, an information processing method, and a computer program, wherein content usage restrictions are set regarding small contents besides AV stream data such as movies and the like, in the same way with AV stream data, thereby realizing strict content protection.

An information processing device according to an embodiment of the present invention is for executing content reproduction processing from an information recording medium, and includes: a security information processing unit for determining output messages based on security check information in a content reproduction sequence, and outputting a message output command accompanied by selection information of the output message to a user interface processing unit; and a user interface processing unit for obtaining message information based on the selection information input from the security information processing unit, and outputting to a display unit. Note that the display unit for output from the user interface may belong to this information processing device, or may be output to a display unit which an external display device has.

The security information processing unit may be of a configuration for executing processing for determination of output message contents based on security check information, and determination processing of output message language based on content reproduction player information, and executing outputting message selection information for making selection following this determination information to the user interface processing unit.

The user interface processing unit may be of a configuration for executing processing for receiving user input corresponding to displayed message on the display unit, and outputting the received user input information to the security information processing unit.

The user interface processing unit may be configured as an onscreen display (OSD) function executing unit, with the security information processing unit being of a configuration for executing message output commands accompanied by selection information of the output message, based on an OSD call-up (OSD_CALL).

Further, the security information processing unit may be configured as a virtual machine for obtaining a command code recorded in an information recording medium and executing data processing according to the command code.

An information processing device according to another embodiment of the present invention is for executing content reproduction processing from an information recording medium, and includes: a security information processing unit for executing processing for obtaining error code corresponding to security check information in a content reproduction sequence, and writing the error code to a register or memory; and an application executing unit for obtaining the error code from the register or memory, obtaining message information corresponding to the obtained error code, and outputting the obtained message on a display unit.

The application executing unit may be of a configuration for executing processing for receiving user input corresponding to the display message on the display unit, and writing the received user input information to a register or memory; with the security information processing unit being of a configuration for executing processing for obtaining the user input information written to the register or memory.

The security information processing unit may have a configuration for outputting an execution application switchover command to the application executing unit such that, based on the application switchover command, the application executing unit executes switchover to an application which executes data transfer processing with the security information processing unit via register or memory, and performs message output to the display unit.

The security information processing unit and the application executing unit may write status values indicating processing status to the register or memory, with the security information processing unit and the application executing unit being of a configuration to execute reading of a status value indicating processing status written to the register or memory, and perform confirmation of the processing status.

The security information processing unit and the application executing unit may be of a configuration for executing mutual reliability confirmation processing by data transfer processing applying the register or memory.

The security information processing unit may be configured as a virtual machine which obtains command code recorded in an information recording medium and executes data processing following the command code.

Further, an information processing device according to yet another embodiment of the present invention includes: an application executing unit for executing applications stored in an information recording medium; and a security information processing unit for executing processing for writing, to a register or memory, a parameter necessary for execution or continuation of an application at the application executing unit; wherein the application executing unit is of a configuration for obtaining a parameter from the register or memory which the security information processing unit has written, and executing data processing necessary for execution or continuation of the application by computation processing or encryption processing applying the parameter, thereby executing or continuing the application.

Further, according to an embodiment of the information processing device according to the present invention, the register or memory is a player status register, and has a first player status register wherein the security information processing unit performs writing and the application executing unit performs reading, and has a second player status register wherein the application executing unit performs writing and the security information processing unit performs reading.

Further, the security information processing unit may be of a configuration for executing sequential writing processing of different parameters to the register or memory, and the application executing unit may be of a configuration for sequentially obtaining, from the register or memory, different parameters which the security information processing unit sequentially writes thereto, and executing computation processing or encryption processing applying sequentially different parameters, thereby executing or continuing the application.

The application executing unit may be of a configuration for executing generation processing of output data by executing computation processing or encryption processing applying parameters obtained from the register or memory.

Further, the application executing unit may be of a configuration for executing generation processing of output data by exclusive-OR operation processing applying parameters obtained from the register or memory, or encryption processing using the parameters, or decryption processing with an encryption key generated by encryption processing applying the parameters.

Further, an information recording medium according to an embodiment of the present invention is for storing, as recorded data, an application and content including code information executed by a virtual machine, wherein the application is a program containing an execution routine for periodic referencing processing of a register or memory, and wherein the code information is configured as information containing a command for executing processing for writing an error code obtained as a security check result to a register or memory.

Further, an information processing method according to an embodiment of the present invention is for executing content reproduction processing from an information recording medium, and includes the steps of: security information processing performed at a security information processing unit, for determining output messages based on security check information in a content reproduction sequence, and outputting of a message output command accompanied by selection information of the output message to a user interface processing unit; and user interface processing performed at a user interface processing unit, for obtaining message information based on the selection information input from the security information processing unit, and outputting to a display unit.

Further, in the security information processing, there may be executed processing for determination of output message contents based on security check information, and determination processing of an output message language based on content reproduction player information, and also executed outputting of message selection information for making selection following this determination information to the user interface processing unit.

Further, the information processing method may further comprise a step for, at the user interface processing unit, receiving user input corresponding to displayed message on the display unit, and outputting the received user input information to the security information processing unit.

Further, the user interface processing unit may be configured as an onscreen display (OSD) function executing unit, with execution being performed, in the security information processing, of message output commands accompanied by selection information of the output message, based on an OSD call-up (OSD_CALL).

Further, an information processing method according to another embodiment of the present invention is for executing content reproduction processing from an information recording medium, and includes the steps of: security information processing, performed at a security information processing unit, for executing processing for obtaining error code corresponding to security check information in a content reproduction sequence, and writing the error code to a register or memory; and application executing, performed at an application executing unit, for obtaining the error code from the register or memory, obtaining message information corresponding to the obtained error code, and outputting the obtained message on a display unit.

Further, the information processing method may further include the steps of: executing processing, performed at the application executing unit, for receiving user input corresponding to the display message on the display unit, and writing the received user input information to a register or memory; and executing processing, performed at the security information processing unit, for obtaining the user input information written to the register or memory.

Further, the information processing method may further include the steps of: outputting of an execution application switchover command to the application executing unit, performed at the security information processing unit; and executing of switchover to an application which executes data transfer processing with the security information processing unit via register or memory, and performing message output to the display unit, based on the application switchover command, performed at the application executing unit.

Further, the information processing method may further include the steps of: writing of status values indicating processing status to the register or memory, performed at the security information processing unit and the application executing unit; and executing of reading of a status value indicating processing status written to the register or memory, and performing confirmation of the processing status, performed at the security information processing unit and the application executing unit.

Further, the information processing method may further include a step performed at the security information processing unit and the application executing unit, for executing mutual reliability confirmation processing by data transfer processing applying the register or memory.

Further, an information processing method according to yet another embodiment of the present invention may include the steps of: application executing, performed at an application executing unit, for executing applications stored in an information recording medium; parameter writing, performed at a security information processing unit, for executing processing for writing, to a register or memory, a parameter necessary for execution or continuation of an application at the application executing unit; and obtaining of a parameter from the register or memory which the security information processing unit has written, and executing data processing necessary for execution or continuation of the application by computation processing or encryption processing applying the parameter, performed at the application executing unit, thereby executing or continuing the application.

Further, the parameter writing may be performed at the security information processing unit, for executing sequential writing processing of different parameters to the register or memory; with the application executing unit sequentially obtaining, from the register or memory, different parameters which the security information processing unit sequentially writes thereto, and executing computation processing or encryption processing applying sequentially different parameters, thereby executing or continuing the application.

Further, the application executing unit may execute generation processing of output data by executing computation processing or encryption processing applying parameters obtained from the register or memory.

Further, the application executing unit may be of a configuration for executing generation processing of output data by exclusive-OR operation processing applying parameters obtained from the register or memory, or encryption processing using the parameters, or decryption processing with an encryption key generated by encryption processing applying the parameters.

Further, a computer program according to another embodiment of the present invention is for executing reproduction processing of content recorded in an information recording medium on an information processing device, and the program includes code for the steps of: security information processing, performed at a security information processing unit, for determining output messages based on security check information in a content reproduction sequence, and outputting a message output command accompanied by selection information of the output message to a user interface processing unit; and user interface processing, performed at a user interface processing unit, for obtaining message information based on the selection information input from the security information processing unit, and outputting to a display unit.

Further, a computer program according to another embodiment of the present invention is for executing reproduction processing of content recorded in an information recording medium on an information processing device, and the program includes: security information processing performed at a security information processing unit, for executing processing for obtaining error code corresponding to security check information in a content reproduction sequence, and writing the error code to a register or memory; and application executing, performed at an application executing unit, for obtaining the error code from the register or memory, obtaining message information corresponding to the obtained error code, and outputting the obtained message on a display unit.

Further, a computer program according to yet another embodiment of the present invention is for executing reproduction processing of content recorded in an information recording medium on an information processing device, and the program includes the steps of: application executing, performed at an application executing unit, for executing applications stored in an information recording medium; parameter writing, performed at a security information processing unit, for executing processing for writing, to a register or memory, a parameter necessary for execution or continuation of an application at the application executing unit; and obtaining of a parameter from the register or memory which the security information processing unit has written, and executing data processing necessary for execution or continuation of the application by computation processing or encryption processing applying the parameter, performed at the application executing unit, thereby executing or continuing the application.

Note that the computer program according to the present invention is, for example, a computer program capable of providing a computer system capable of executing various types of program codes, through storage media or communication media capable of providing in a computer-readable format, e.g., recording mediums such as CDs, FDs, MOs, and so forth, or communication mediums such as a network or the like. Providing such a program in a computer-readable format realizes processing corresponding to the program on the computer system.

Other objects, features, and advantages of the present invention will become apparent from further detailed description by way of later-described embodiments of the present invention and attached drawings. Note that the term "system" as used in the present specification refers to a logical assembly arrangement of multiple devices, and is not restricted to an arrangement wherein all of the component devices are in the same housing.

According to the configuration of one embodiment of the present invention, a configuration is implemented wherein content usage based on proper content usage rights is permitted in reproduction of content stored in an information recording medium, and further, in cases wherein unauthorized content usage has been determined based on a security check, messages can be displayed regarding the reason that content reproduction has been suspended, and user response to the display message can be accepted, thereby enabling processing for describing the situation to the user, and accepting confirmation and approach of the user.

Also, according to the configuration of one embodiment of the present invention, data is transferred between an application executing unit for executing content, including small content such as Java (registered trademark) and HDMV, and a secure VM serving as a security information processing unit, via a register or memory, thereby enabling usage control of content.

BRIEF DESCRIPTION OF THE DRAWINGS

FIG. 8 is a diagram describing transformation data application processing executed at the time of content reproduction;

FIG. 9 is a diagram describing the data configuration of a fix-up table stored in the information recording medium;

FIG. 10 is a diagram illustrating a content reproduction processing example 2;

FIG. 11 is a diagram describing a configuration for executing message presentation to a display unit by a secure VM;

DESCRIPTION OF THE PREFERRED EMBODIMENTS

An information processing device, information recording medium, information processing method, and computer program, according to the present invention, will be described in detail with reference to the drawings. Note that the description will be made according to the following items.

Figure 1:
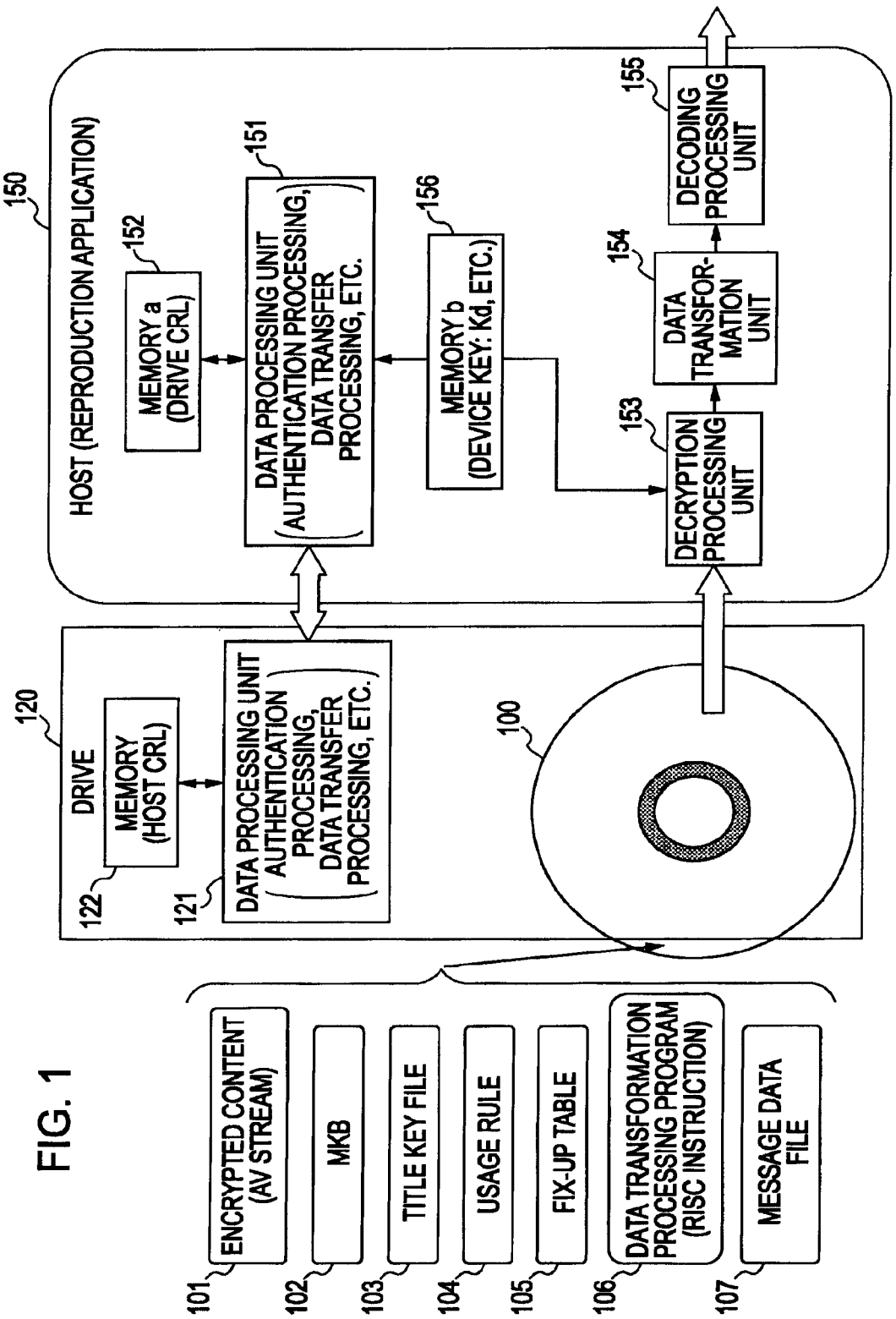
FIG. 1 is a diagram describing the configuration and processing of stored data in an information recording medium, and a drive device and information processing device.

1. Overview of Stored Data in an Information Recording Medium, and Processing at a Drive and a Host
  2. About the Content Managing Unit (CPS unit)
  3. Content Reproduction Processing
  (3.1) Content Reproduction Processing Example 1
  (3.2) Content Reproduction Processing Example 2
  4. Message Display and Content Usage Control Processing
  (4.1) Message Display Using UI (User Interface) Processing Unit
  (4.2) Message Display and Content Usage Control Processing Using Registers
  (4.2.1) Execution Example of UI Function Providing Application Using Registers
  (4.2.2) UI Function Providing Example by Usage of Registers and Title Switchover
  (4.2.3) Content Usage Control Example by Usage of Registers
  (4.2.4) Processing Example 1 Employing Registers Used by Application Executing Unit
  (4.2.5) Processing Example 2 Employing. Registers Used by Application Executing Unit
  (4.3) Message Display and Content Usage Control Using Shared Memory Space
  (4.4) About the Authoring Process
  5. Configuration of Information Processing Device
1. Overview of Stored Data in an Information Recording Medium, and Processing at a Drive and a Host First, description will be made regarding the overview of stored data in an information recording medium, and processing at a drive and a host. FIG. 1 illustrates the configuration of an information recording medium 100 with content stored therein, a drive 120, and a host 150. The host 150 is a data reproduction (or recording) application which is executed on an information processing device such as a PC or the like, for example, and performs processing using the hardware of the information processing device such as a PC or the like, following a predetermined data processing sequence.

The information recording medium 100 is an information recording medium such as, for example, a Blu-ray disk, DVD, or the like, and is an information recording medium storing authorized content (ROM disc or the like), manufactured at the disc manufacturing plant under the permission of the so-called content right holder, having proper content rights or distribution rights, or an information recording medium capable of recording data (RE disk or the like). Note that with the following embodiment, a disk-type medium will be used as an example for describing the information recording medium, but the present invention is capable of being applied to configurations using various types of information recording media.

As shown in FIG. 1, the information recording medium 100 stores in corrected content 101 which has been subjected to encryption processing and partial replacement of data, MKB (Medium Key Block) 102 which is the encryption key block generated based on a tree structure key distribution method known as a type of broadcast encryption method, a title key file 103 configured of data wherein a title key to be applied for content decryption processing is encrypted (Encrypted CPS Unit Key) and so forth, usage rule 104 including CCI (Copy Control Information) and the like serving as copying/reproduction control information of content, a Fix-Up Table 105 wherein is registered transformation data corresponding to replacement data at a predetermined region within the content, a data transformation processing program 106 including processing commands for executing the data transformation processing using the registered data of the Fix-Up Table 105, and a message data file 107 storing display data such as message data to be presented on the display in the event that content reproduction has been suspended, such as an error message or the like for example. Note that the data example shown in the diagram is but an example, and the stored data differs more or less depending on the type of disk. The overview of each of these types of information will be described.

(1) Encrypted Contents 101

Various types of contents are stored in the information recording medium 100. Examples of the contents include AV (Audio Visual) streams of moving picture contents such as HD (High-Definition) movie content which is high-definition moving picture data, game programs of a format stipulated under a particular standard, image files, audio data, text data, and so forth. These contents are data stipulated under a particular AV format, and are stored according to the particular AV data format. Specifically, this is stored according to the Blu-ray disk ROM standard format, as Blu-ray disk ROM standard data, for example.

Further, there are cases wherein game programs, image files, audio data, text data, and so forth, are stored as service data, for example. There are cases wherein these contents are stored as data having a data format not following the particular AV data format.

Types of contents include various contents such as music data, moving picture, still images, and like image data, as well as game programs, Web contents, and so forth, and information of various forms is included in these contents, such as content information usable only by the data from the information recording medium 100, content information usable by combining data from the information recording medium 100 and data provided from the server connected to a network, and so forth. Contents stored in the information recording medium are stored encrypted, with a different key appropriated for each section content (CPS unit key or unit key (or also may be called a title key)), to realize different usage control for each section content. Each unit to which one unit key is appropriated is called a content managing unit (CPS unit). Further, the configuration data of the content is set as broken data wherein a part thereof is replaced with data different from the correct content data, so decryption processing alone does not reproduce the correct content, and processing for replacing the broken data with data registered in a fix-up table is necessary to perform reproduction. This processing will be described later in detail.

(2) MKB

The MKB (media key block) 102 is an encryption key block generated based on a tree structure key distribution method known as a type of broadcast encryption method. The MKB 102 is a key information block enabling acquiring of a media key [Km] necessary for decrypting contents, only for processing (decryption) based on a device key [Kd] stored on the information processing device of the user having a valid license. This is an application of an information distribution method following a so-called hierarchical tree structure, enabling the acquiring of the media key [Km] only in the event that the user device (information processing device) has a valid license, and user devices which are invalidated (revoking processing) are incapable of acquiring a media key [Km].

An administration center serving as a license entity can generate an MKB having a structure which cannot be decrypted with the device key stored in a certain user device, i.e., wherein the media key necessary for content decryption cannot be acquired, by changing the device key used for decryption of key information stored in the MKB. Accordingly, unauthorized devices can be revoked at an arbitrary timing, thereby providing encrypted contents capable of decryption only to devices having valid licenses. Content decryption processing will be described later.

(3) Title Key File

As described above, each content or group of multiple contents are subjected to encryption applying a individual encryption keys for each (title key (CPS unit key)) for managing usage of contents, and stored in the information recording medium 100. That is to say, AV (audio visual) streams, music data, moving pictures, still images, and like image data, game programs, Web content, and so forth, making up the contents, need to be sectioned into units of management of contents usage, with a different title key generated for each section unit, thereby carrying out decryption processing. Information for generating these title keys is title key data, and a title key is obtained by decrypting an encrypted title key with a key generated by a media key or the like, for example. Title keys corresponding to each unit are generated following a predetermined encryption key generating sequence using title key data, and decryption of contents is carried out.

(4) Usage Rule

Usage rule includes, for example, copy/reproduction control information (CCI). This is copy restriction information and reproduction restriction information for usage control corresponding to the encrypted contents 101 stored in the information recording medium 100. There are various settings for the copy/reproduction control information (CCI), such as cases as information for individual CPS units set as content managing units, cases for being set corresponding to multiple CPS units, and so forth.

(5) Fix-Up Table

As described above, the encrypted content 101 stored in the information recording medium 100 has been subjected to predetermined encryption, and also, a part of the contents configuration data is configured of broken data which is different from the proper data. In order to reproduce the content, data overwriting processing is necessary, wherein the broken data is replaced with the transformation data which is the proper content data. The table in which the transformation data is registered is a fix-up table 105. A great number of broken data is set scattered throughout the content, and at the time of reproducing the content, processing is necessary for replacing (overwriting) the multiple pieces of broken data with the transformation data registered in the fix-up table. Applying this transformation data means that even in the event that unauthorized content decryption is performed due to an encryption key leaking, for example, reproduction of proper content is impossible by content decryption alone, due to the presence of the replaced data, thereby enabling unauthorized contact usage to be prevented.

In addition to normal transformation data, the fix-up table 105 includes transformation data enabling analyzing data identification information configuration bits for identifying the contents reproducing device or content reducing application. Specifically, for example, this includes a player ID which is identification data of a player (a device for executing a host application), or "transformation data including identification marks" wherein is recorded identification information generated based on the player ID. Transformation data including the identification marks is data wherein the bid values of the proper content data has been slightly changed, at the level which does not affect the reproduction of content. Details of processing using such transformation data will be described later.

While FIG. 1 illustrates an example wherein the fix-up table 105 is set as an independent data file, a configuration may be made wherein the fix-up table is not an independent file, but scattered throughout the configuration packets of the encrypted contents 101. The configuration and processing of these will be described later.

(6) Data Transformation Processing Program

The data transformation processing program 106 is a program including processing commands for executing the data transformation processing by registered data in the fix-up table 105, and is used by a host which reproduces the content. This is executed at a data transformation processing unit 154 of the host 100 shown in FIG. 1.

At the host, a virtual machine (VM) for executing the data transformation processing is set, the data transformation processing program 106 read out of the information recording medium 100 is executed at the virtual machine (VM), registered data in the fix-up table 105 is applied, and data transformation processing of the partial configuration data is executed with regard to the decrypted content. Details of this processing will be described later.

(7) Message Data File

A message data file is a file storing display data such as message data to be presented on the display in the event that content reproduction has been suspended, such as error messages, containing multiple sets of data according to the type of error and language. For example, in a case wherein reproduction of content is suspended due to a security problem, an appropriate message is selected from the message data file and presented on the display. The user can confirm the error status and handling information based on the information displayed on the display. Details of this processing will be described later in the section on [4. Message Display and Content Usage Control Processing].

Next, the configuration of the host 150 and drive 120, and overview of processing, will be described with reference to FIG. 1. Reproduction processing of the content stored in the information recording medium 100 is executed upon data being transferred to the host 150 via the drive 120. Before usage of the content, mutual authentication processing is executed between the drive 120 and host 150, and following confirmation of the validity of both parties by this authentication processing being established, encrypted content is transferred from the drive to the host, content decryption processing is performed at the host side, and further, the above-described data transformation processing by the fix-up table is executed, whereby content reproduction is performed.

For the mutual authentication executed between the host 150 and the drive 120, processing for determining the validity is executed by referencing a revocation (invalidation) list issued by an Administration Center whether or not each of the devices or applications are registered as an unauthorized device or application.

The drive 120 has memory 122 for storing a host CRL (Certificate Revocation List) storing revocation (invalidation) information of the host certificate (public key certificate). On the other hand, the host 150 has memory 152 for storing a drive CRL (Certificate Revocation List) storing revocation (invalidation) information of the drive certificate (public key certificate). The memory is nonvolatile memory (NVRAM), and in the event that the CRL read out from the information recording medium 100 is a newer version, for example, their respective data processing units 121 and 151 performs updating processing for storing the host CRL or the drive CRL of the new version in the memory 122 and 152.

A CRL, such as the host CRL or drive CRL is constantly updated by the administration center. That is to say, in the event that an unauthorized device has been newly discovered, an updated CRL wherein the certificate ID issued to the unauthorized device or the device ID or the like is added at as a new entry, is issued. Each CRL is provided with the version number, and has a configuration wherein the newness can be compared. For example, in the event that a CRL read out from an information recording medium mounted to the drive is newer than the CRL stored in the memory 122 within the drive, the drive performs CRL updating processing. The host 150 also performs drive CRL updating in the same way.

Besides this CRL updating processing, the data processing unit 121 of the drive 120 performs authentication processing with a host that is executed at the time of using content, and further performs processing for reading data from the information recording medium and transferring the data to the host.

As described above, the reproduction (player) application 150 of the host 150 is a data reproduction (or recording) application executed on an information processing device such as the PC for example, and performs processing using the hardware of the information processing device such as a PC or the like, following a predetermined data processing sequence.

The host 150 has a data processing unit 151 for performing mutual authentication processing with the drive 120, data transfer control, and so forth, a decryption processing unit 153 for performing decryption processing of encrypted content, a data transformation processing unit 154 for performing data transformation processing based on registered data in the aforementioned fix-up table 105 and a decoding processing unit 155 for performing decoding (e.g., MPEG decoding) processing.

The data processing unit 151 executes authentication processing between the host and drive, and within the authentication processing, references the drive CRL stored in memory a152 which is nonvolatile memory (MVRAM), to confirm that the drive is not a drive which has been revoked. The host also performs updating processing to store the drive CRL of a new version in the memory a152.

The decryption processing unit 153 generates the key to be applied to content decryption, using various types of information stored in the memory b156 and data read from the information recording medium 100, executing decryption processing of the encrypted content 101. The data transformation processing unit 154 performs replacement processing (overwriting) of contents configuration data applying the transformation data registered in the fix-up table obtained from the information recording medium 100, following the data transformation processing program obtained from the information recording medium 100. The decoding processing unit 155 performs decoding (e.g., MPEG decoding) processing.

The memory b156 of the information processing device 150 stores a device key: Kd, key information to be applied to mutual authentication processing, key information to be applied to decryption, and so forth. Details of content decryption processing will be described later. The device key: Kd is a key to be applied to the above-described MKB processing. MKB is a key information block which enables obtaining of a media key [Km], which is a key necessary for deciphering content, to be obtainable only by processing (decrypting) based on a device key [Kd] stored in the information processing device of the user which has a valid license, and at the time of decrypting encrypted content, the information processing device 150 applies the device key: Kd stored in the memory b156 to execute the MKB processing. Details of content decryption processing will be described later.

2. About the Content Managing Unit (CPS Unit)

As described above, the content stored in the information recording medium is subjected to decryption processing and is stored with different keys appropriated for each unit, in order to realize different usage control for each unit. That is to say, the content is sectioned into content managing unit (CPS units), individual decryption processing is performed, and individual usage management is made.

At the time of using contents, first, there is the need to obtain a CPS unit Key (also called a title key) appropriated to each unit, and further, reproduction is performed by executing data processing based on decryption processing sequences determined beforehand, applying other necessary keys, key generating information, and so forth. The settings of a content management unit (CPS unit) will be described with reference to FIG. 2.

Figure 2:
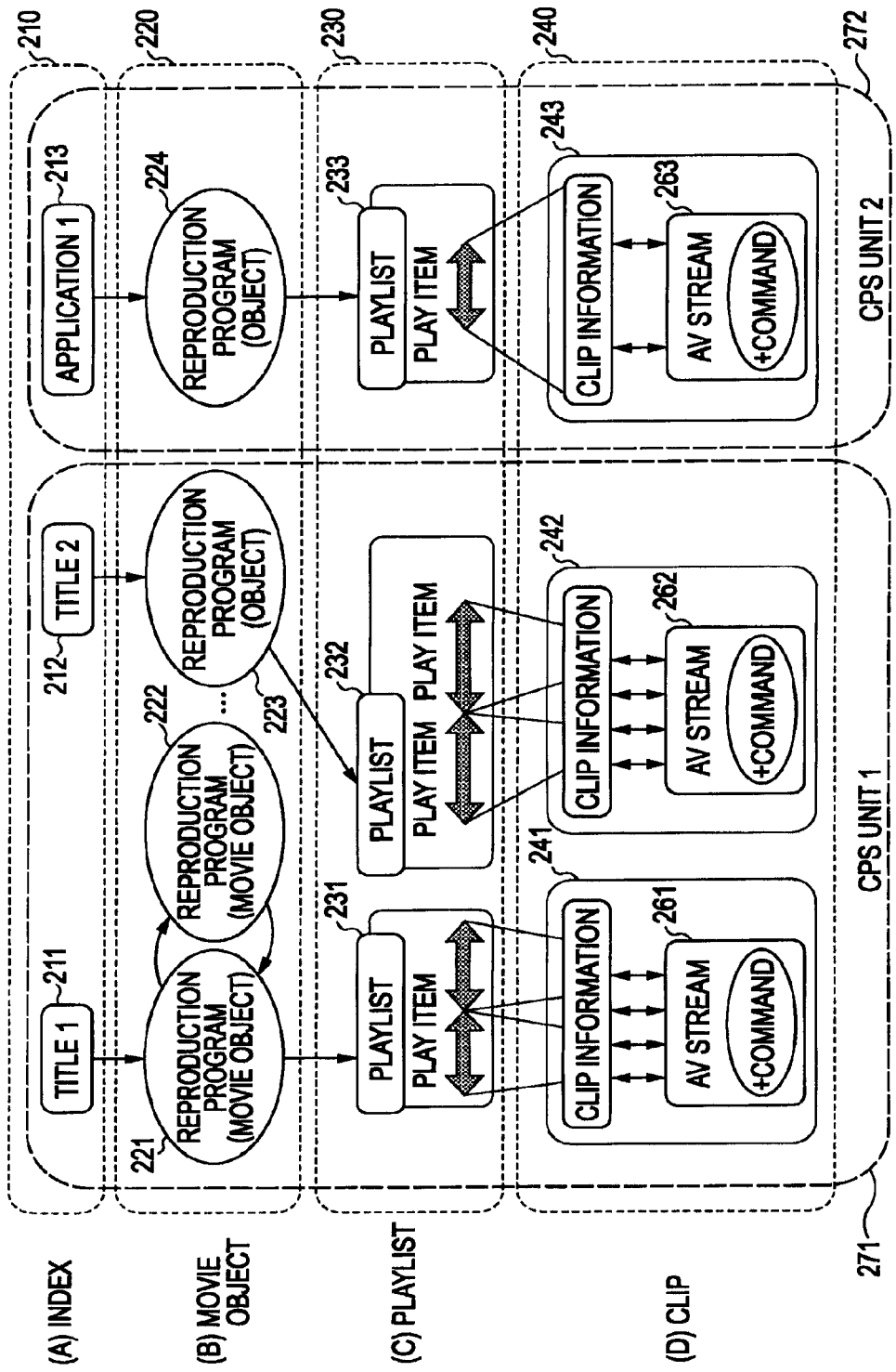
FIG. 2 is a diagram describing a setting example of a content managing unit for settings made regarding stored data in the information recording medium.

As shown in FIG. 2, the content has a hierarchical configuration of (A) index 210, (B) movie object 220, (C) playlist 230, and (D) clip 240. Specifying an index such as a title to be accessed by the reproduction application specifies a reproduction program correlated with the title, for example, and the play list stipulating the order of reproducing the content is selected according to the program information of the reproduction program that has been specified.

Play items are included in the play list as information of the data to be reproduced. An AV stream which is actual data of the content, or commands, are selectively read out by clip information for reproduction sections stipulated by play items included in the play list, and reproduction of the AV stream and execution processing of the commands are performed. Note that a great number of playlists and play items exist, and each has a corresponding playlist ID and play item ID, as identification information.

FIG. 2 illustrates two CPS units. These make up a part of the content stored in the information recording medium. Each of the CPS unit 1 271, and the CPS unit 2 272 are CPS units which have been set as units including a title serving as an index, a movie object which is a reproduction program file, a play list, and a clip including an AV stream file which is the actual contents data.

A content managing unit (CPS unit) 1 271 includes a title 1 211 and title 2 212, reproduction programs 221 and 222, play lists 231 and 232, a clip 241 and a clip 242, and AV stream data files 261 and 262 which are the actual data of the content contained in the two clips 241 and 242 are at least the object data of encryption, and accordingly is set as data encrypted applying a title key (Kt1) which is an encryption key set corresponding to the content managing unit (CPS unit) 1 271 as a rule (also called a CPS unit key).

A content managing unit (CPS unit) 2 271 includes an application 1 213 as an index, a reproduction program 224, playlist 233, and a clip 243, and an AV stream data file 263 which is the actual data of the content contained in the clip 243 is encrypted applying a title key (Kt2) which is an encryption key set corresponding to the content managing unit (CPS unit) 2 272.

For example, in order for the user to execute an application file or content reproducing processing corresponding to the content managing unit 1 271, a title key: Kt1 serving as an encryption key which is set so as to be correlated with the content managing unit (CPS unit) 1 271, needs to be obtained and subjected to decryption processing. In order for the user to execute an application file or content reproducing processing corresponding to the content managing unit 2 272, a title key: Kt2 as an encryption which is set so as to be correlated with the content managing unit (CPS unit) 2 272, needs to be obtained and subjected to decryption processing.

Figure 3:
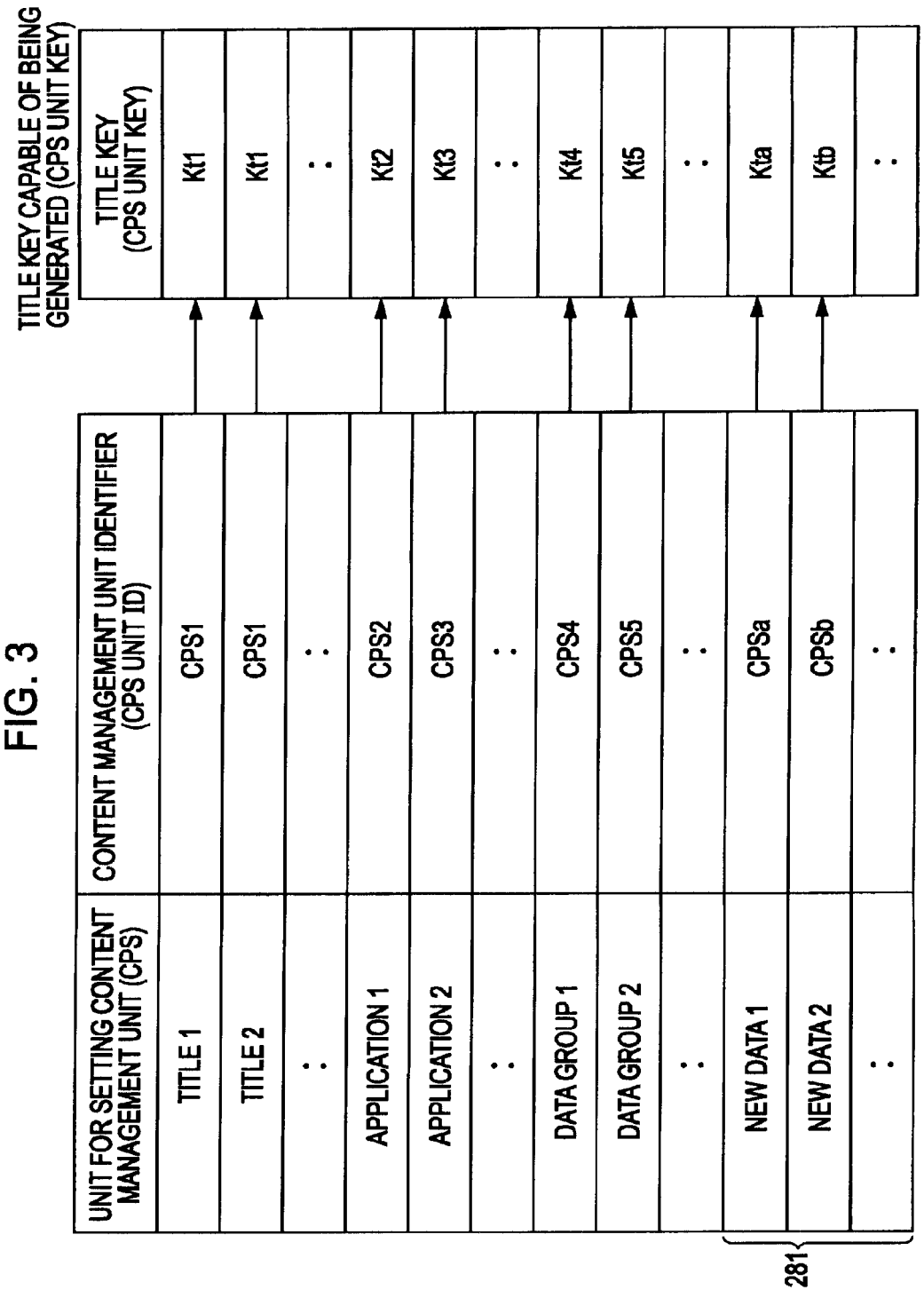
FIG. 3 is a diagram describing the correlation between the content managing unit for settings made regarding stored data in the information recording medium and a unit key.

FIG. 3 shows the CPS unit setting configuration, and example of corresponding title keys. FIG. 3 shows correlation between CPS unit setting units which are units for managing usage of the encrypted content stored in the information recording medium, and title keys (the CPS unit keys) applicable to each CPS unit. Note that a CPS unit and title key for data to come later may be stored and set beforehand. For example, the data unit 281 is entries for data to come later.

CPS unit setting units come in a wide variety, such as content titles, applications, data groups, and so forth, and each CPS unit managing table has set therein CPS unit IDs serving as identifiers corresponding to each of the CPS units.

In FIG. 3, title 1 for example is the CPS unit 1, and at the time of decrypting encrypted content belonging to the CPS unit 1, generating the title key Kt1 and performing decryption processing based on the generated title key Kt1 is necessary.

In this way, the content stored in the information recording medium 100 is stored in a manner having been subjected to encryption processing with different encryption keys appropriated to each of the units, in order to realize usage control different for each of the units. UR (usage rules) for each of the content managing unit (CPS unit) are set for individual usage management with regard to each content managing units (CPS unit). Usage rules are information including, e.g., copy/reproduction control information (CCI) of content, as described above, and is copy restriction information or reproduction restriction information of the encrypted content contained in each of the content managing units (CPS units).

Data processing applying various types of information stored in the information recording medium is necessary for generating a title key. Specific examples of such processing will be described later in detail.

Next, a directory configuration corresponding to content having the hierarchical structure shown in FIG. 2 will be described with reference to FIG. 4.

Figure 4:
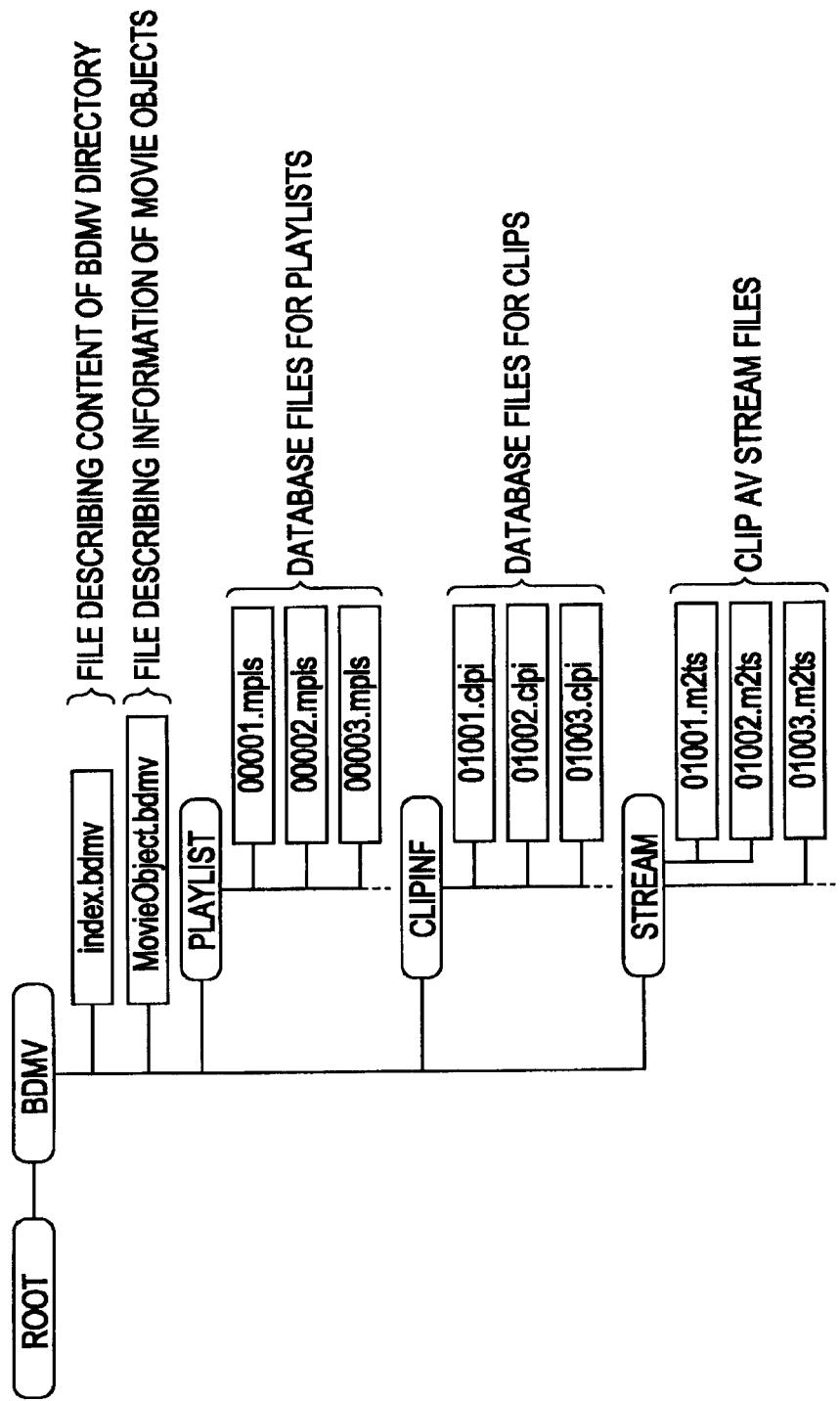
FIG. 4 is a diagram describing a directory configuration set regarding content stored in the information recording medium.

(A) The index 210 in FIG. 2 is the index.bdmv file in the directory in FIG. 4.

(B) The movie object 220 in FIG. 2 is the MovieObject.bdmv file in the directory in FIG. 4.

(C) The playlist 230 in FIG. 2 is the files under the PLAYLIST directory in the directory in FIG. 4.

(D) The clip 240 in FIG. 2 corresponds to the files under the CLIPINF directory and STREAM directory in the directory in FIG. 4 having the same file Nos.

As described earlier, a part of the configuration data of the content stored in the information recording medium is set as broken data that is replaced with data different from the correct content data, so decryption processing alone does not reproduce the correct content, and processing for replacing the broken data with data registered in a fix-up table is necessary to perform reproduction. The data transformation processing program 106 stored in the information recording medium is applied to this replacing processing, and data transformation processing with registered data in the Fix-Up Table 105 is performed.

Figure 5:
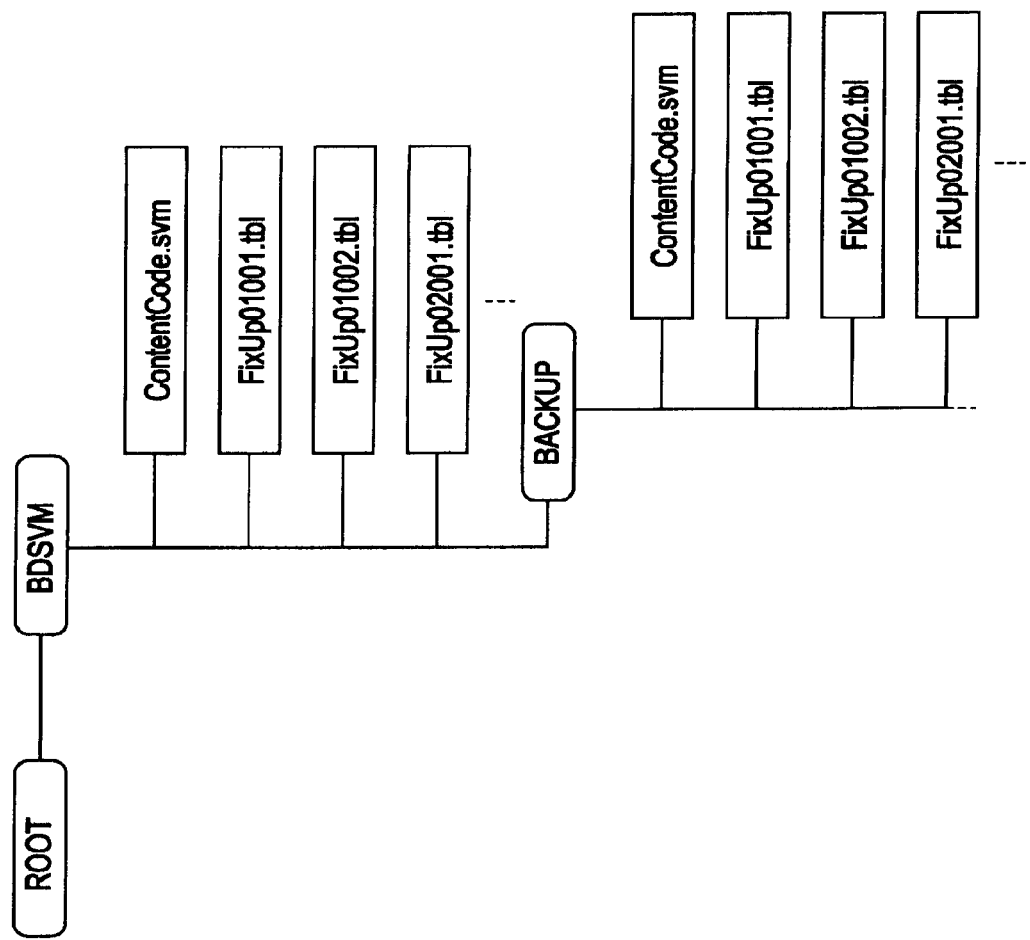
FIG. 5 is a diagram describing a fix-up table and data transformation processing program directory configuration.

As described above, the fix-up table 105 and data transformation processing program 106 are recorded in the information recording medium. FIG. 5 shows the directory configuration of fix-up tables corresponding to content having the direction configuration shown in FIG. 4, and the data transformation processing program. FIG. 5 is the directory configuration of the data transformation processing program created with regard to the AV content having the directory structure shown in FIG. 4, and the fix-up tables.

[ContentCode.svm] shown in FIG. 5 is the data transformation processing program, and [FixUpXXXXX.tbl] shown in FIG. 5 are fix-up tables defined for each clip (XXXXX matches the file No. of the clip information file).

3. Content Reproduction Processing

The following is a description of multiple processing examples of cases of executing mutual authentication between the drive and host, and on the condition that authentication is established, the content stored in the information recording medium mounted to the drive is transferred from the drive to the host and content reproduction processing is executed.

(3.1) Content Reproduction Processing Example 1

Figure 6:
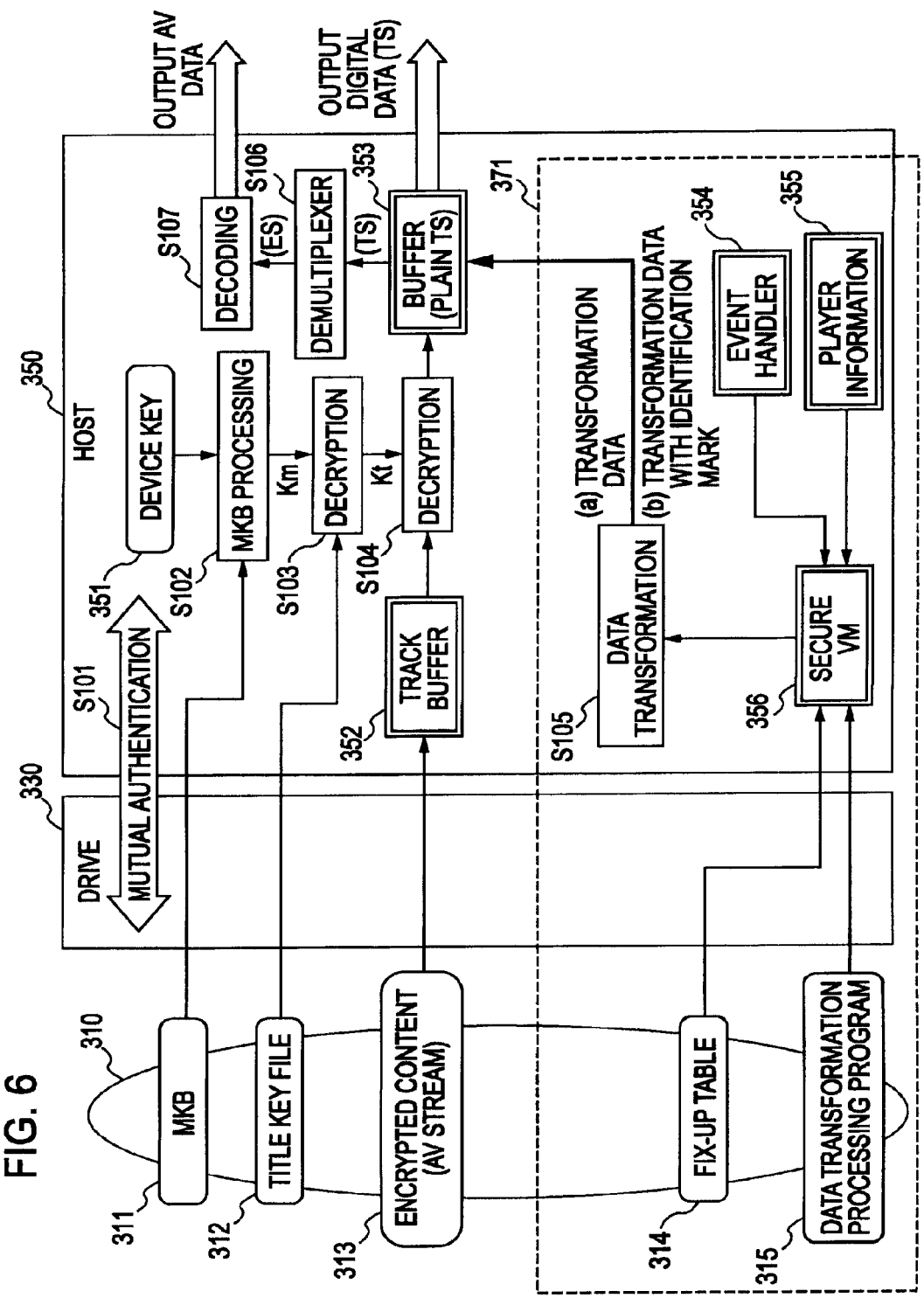
FIG. 6 is a diagram illustrating a content reproduction processing example 1.

First, a content reproduction processing example 1 will be described with reference to FIG. 6. FIG. 6 illustrates, from the left, an information recording medium 310 storing encrypted contents, a drive 330 into which the information recording medium 310 is set so as to execute data reading, and a host 350 which is connected with the drive so as to be capable of data communication, and which obtains the content stored in the information recording medium 310 by the drive 330 and executes a reproduction application which executes reproduction processing thereof. The host 350 is executed by an information processing device such as a PC, for example.

The information recording medium 310 stores an MKB (Media Key Block) 311, title key file 312, encrypted content 313, fix-up tables 314, and data transformation processing program 315. The host 350 holds the device key 351 to be applied to the MKB processing.

The processing sequence wherein the host 350 shown in FIG. 6 obtains and reproduces the stored content within the information recording medium 310 via the drive 330 will be described. First, before reading out the stored content in the information recording medium 310, the host 350 and drive 330 execute mutual authentication in step S101. This mutual authentication is processing for confirming that the host and drive are each authorized devices or application software. Various types of processing can be applied to this mutual authentication processing sequence. An example thereof will be described with reference to FIG. 7.

Figure 7:
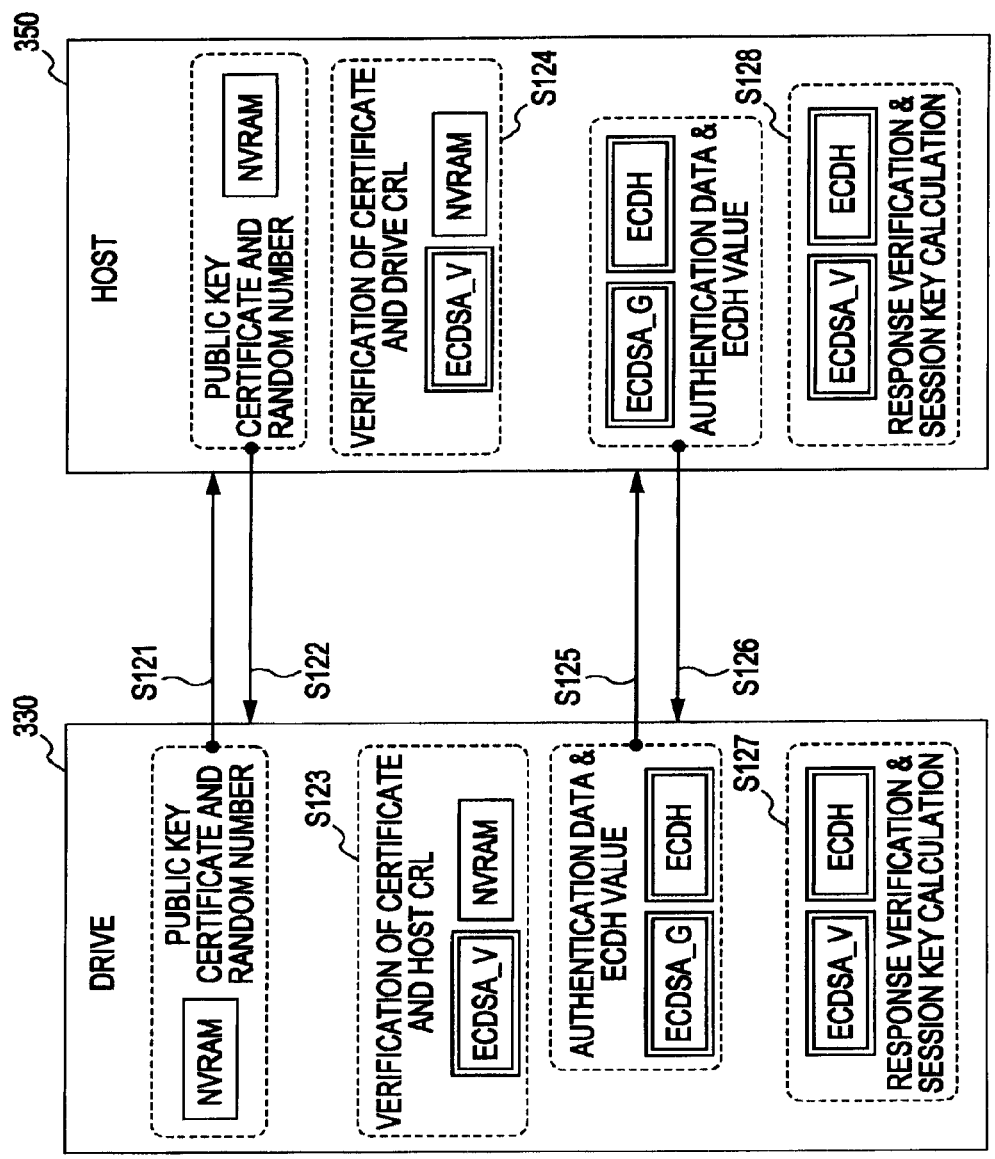
FIG. 7 is a diagram describing a mutual authentication sequence between a drive and host.

FIG. 7 is an example of a mutual authentication sequence according to the public key method. First, in step S121, the drive 330 transmits a drive public key certificate stored in its own memory (NVRAM), and an arbitrarily-generated random number to the host. In step S122, the host 350 also transmits a host public key certificate stored in its own memory (NVRAM) and an arbitrarily-generated random number to the drive.

In step S123, the drive 330 verifies the correctness of the host public key certificate received from the host, and the revocation status of the host, based on a host certificate revocation list (host CRL: Certificate Revocation list). In step S123, the drive 330 first executes verification of the signature set to the host public key certificate. ECDSA_V shown in FIG. 7 indicates that signature verification based on elliptic curve encryption is executed. This signature verification is executed applying a public key corresponding to a secret key of a key managing entity. The drive holds the public key of the key managing entity for signature verification in memory (NVRAM), and uses this to perform signature verification. Signature verification is used to confirm that the host public key certificate has not been tampered with. In the event that tampering of the host public key certificate has been determined from the signature verification, the processing is cancelled.

Further, the drive 330 makes reference to the host CRL to confirm that the certificate has not been revoked (invalidated), based on the host public key certificate regarding which non-tampering has become evident. The host CRL is a list of IDs of invalidated certificate regarding public key certificates already issued to the host. The host CRL is obtained from memory or an information recording medium in the drive.

The drive 330 obtains the ID from the host public key certificate regarding which non-tampering has become evident, and determines whether or not the ID matches an ID registered in the host CRL. In the event that an ID which matches exists in the host CRL, determination is made that the host is a host which has been revoked (invalidated), and subsequent processing is cancelled. In the event that the ID obtained from the host public key certificate is not recorded in the host CRL, determination is made that the host is valid and has not been revoked, and processing is continued.

On the other hand, in step S124, the host 350 also performs confirmation of the validity of the drive public key certificate (tampering verification) and determination applying a drive CRL regarding whether or not the drive has been revoked based on the drive public key certificate received form the drive 330. Only in the event that confirmation is made that the drive public key certificate is valid and has not been revoked, is the processing continued. The drive CRL is obtained from memory or an information recording medium in the host.

Next, the drive 330 and host 350 each notify the authentication results thereof in the form of a drive response (S125) and host response (S126). At the time of notification of the authentication results, both sides generate ECDH (Elliptic Curve Diffie Hellman) values as values applying elliptic curve encryption, and notify each other.

Upon receiving the drive authentication results and ECDH value from the host 350, the drive 330 verifies the host response in step S127, confirms establishment of drive authentication, and generates a session key serving as a shared key, applying the received ECDH value. Also, upon receiving the host authentication results and ECDH value from the drive 330, the host 350 verifies the drive response in step S128, confirms establishment of host authentication, and generates a session key serving as a shared key, based on the received ECDH value.

Through such mutual authentication processing, the drive 330 and host 350 share a session key as a shared key.

Let us now return to FIG. 6 to continue description of the content usage processing sequence. In step S101, following mutual authentication being executed between host and drive, and the session key (Ks) shared, the host 350 obtains the MKB 311 recorded in the information recording medium 310 by the drive in step S102, executes processing of the MKB 311 applying the device key 351 stored in memory, and obtains the media key (Km) from the MKB.

As described above, the MKB (Media Key Block) 311 is an encryption key block generated based on a tree structure key distribution system known as a type of broadcast encryption method, and is the key information block enabling obtaining of a media key (Km) which is a key necessary for content decryption, only by processing (decryption) based on the device key (Kd) stored in a device which has a valid license.

Next, in step S103, the media key (Km) obtained by the MKB processing in step S102 is applied to execute decryption of the title key file read from the information recording medium 310, thereby obtaining the title key (Kt). The title key file stored in the information recording medium 310 is a file including data encrypted by the media key, and the title key (Kt) used for decryption of content can be obtained by processing applying the media key. Note that the decryption processing in step S103 applies an AES encryption algorithm, for example.

Next, the host 350 reads out the encrypted content 313 stored in the information recording medium 310 via the drive 330, stores the read out content in the track buffer 352, executes decryption processing applying the title key (Kt) in step S104 for the contents stored in the buffer, and obtains the decrypted content.

The decrypted content is stored in a plaintext TS buffer 353. (Plain TS) means a decrypted plaintext transport stream. Now, the decrypted content stored in the plaintext TS buffer 353 is content containing the above-described broken data, which cannot be reproduced as it is, and there is the need to perform predetermined data transformation (data replacement by overwriting).

Block 371 in FIG. 6 shows this data transformation processing. Block 371 in FIG. 6 is equivalent to the processing performed by the data transformation processing unit 154 of the host 150 shown in FIG. 1. The overview of this data transformation processing will be described with reference to FIG. 8.

The encrypted content 313 shown in FIG. 6 is an encrypted content stored in the information recording medium, this encrypted content being temporarily stored in a track buffer 352 at the host side. This is the track buffer stored data 401 shown in FIG. 8(1).

Decryption of the encrypted content which is the track buffer stored data 401 is executed by the host-side decryption processing, and the decryption result data is stored in the plaintext TS buffer 353. This is the decryption result data 402 shown in FIG. 8(2).

The decryption result data 402 includes broken data 403 which is not the proper content configuration data. The data transformation processing unit of the host executes processing for replacing this broken data 403 with the transformation data 404 which is the correct content configuration data obtained from the fix-up table 314 recorded in the information recording medium 310 shown in FIG. 6. This replacing processing is executed as re-writing (overwriting) processing of a part of data, regarding data written to the plaintext TS buffer 353, for example.

Further, the data transformation processing which the host executes is not only processing for replacing the broken data with transformation data which is the normal content data, but also processing is executed for replacing a part of the configuration data in the decryption result data 402 with transformation data 405 including an identifying mark, as shown in FIG. 8.

An identifying mark is data which enables configuration bits of identification information making a content reproducing device or content reproducing application identifiable. A specific example is the configuration data of identification information (player ID) of an information processing device serving as a player for executing a host application, or an identification mark generated based on the player ID. Identifier-set transformation data is data wherein bit values of the correct content data have been slightly changed within a level that does not affect reproduction of the content, as described above.

A great number of transformation data 405 including an identifying mark are set within the content, and collecting and analyzing the multiple sets of transformation data 405 including an identifying mark determines the player ID, for example. Transformation data 405 including an identifying mark is data wherein the configuration bits of the normal content data has been changed within a level wherein normal reproduction can be made as content, and this data wherein bit (identification mark configuration bit) determining is enabled by MPEG bit stream analysis.

A great number of the transformation data 404 and transformation data 405 including an identifying mark shown in FIG. 8 is registered in the fix-up table stored in the information recording medium, and further, registration is made regarding the write position information of these. Executing data transformation processing based on the fix-up tables stored information replaces the data stored in the plaintext TS buffer 353 with the transformed data 406 shown in FIG. 8 (3).

Returning to FIG. 6, description will be made regarding the processing in the dotted line block 371, i.e., the host-side data transformation processing. Data transformation processing is executed by a secure VM 356 set as a virtual machine within the host, for example. The virtual machine (VM) is a virtual computer which directly interprets and executes an intermediate language, and which interprets and executes command code information in an intermediate language not dependent on a platform.

The secure VM 356 performs processing of reading out a data transformation processing program 315 including command code information from the information recording medium 310 and executes this. The secure VM 356 is subjected to processing control by an event hander 354, also inputs the ID information of the player (information processing device) executing the host application as player information 355, and the data transformation processing program 315 obtained from the information recording medium 310 is executed, with ID information of a player (information processing device) running the host application being input as player information 355. The event handler 354 performs processing surveillance. Emulator checking regarding whether or not processing performed by the secure VM 356 is being performed properly, and the processing and status of other host applications and players (information processing devices) serving as host application execution equipment, is monitored, and in the event that a processing error or unauthorized processing or the like is detected, the data transformation processing by the secure VM 356 is cancelled.

The secure VM 356 applies the fix-up table read out from the information recording medium 310 to perform transformation processing of data stored in the plaintext TS buffer 353. That is to say, this is the data transformation processing of step S105 shown in FIG. 6, with the decryption result data 402 shown in FIG. 8, the broken data 403 is replaced with the transformation data 404 which is the proper content configuration data, and further, data overwriting processing for replacing the transformation data 405 including an identifying mark with a part of the data of the content, thereby changing the stored data in the plaintext TS buffer 353 into transformed data 406.

Subsequently, the transformed TS (Transport stream) is externally output via a network or the like, and is reproduced at an external reproducing apparatus. Or, transformation from a transport stream (TS) to an elementary stream (ES) is executed in step S106 by processing by a demultiplexer, and further, following decoding processing (step S107), this is reproduced via a display and speaker.

The data configuration of the data fix-up table recorded in the information recording medium will be described with reference to FIG. 9. The data fix-up table recorded in the information recording medium has the data configuration shown in FIG. 9, for example. That is, it has the following data.

Number of Fix-Up Entry: the number of fix-up data entries (Number of Fix-Up Entry)

Fix-Up Entry Length: the number of bytes in a single fix-up data entry (Byte Length of one Fix-Up Entry( )(N+6))

SPN (source packet number): the packet number counted from the start position of the AV stream file where the packet in which the transformation data is written is situated (Absolute Transformed Packet Number from the beginning of AV Stream File)

Byte Offset: byte offset indicating the position where writing of the transformation data starts in a packet specified by the SPN (Start byte position of transformed data in the packet)

player_id_bit_position: bit position of identification mark (player ID or the like) (Indicate bit position of Player ID for forensic)

Fix-Up Data: Transformation overwriting data (Value to be overwritten (N byte is transformed in one TS Packet))

A great number of broken data is scattered throughout a single content, and the transformation data recorded in the fix-up table is overwritten at the position of the broken data. Also, a great number of writing positions are set within a single content with regard to the transformation data having identification marks such as player ID or the like. A fix-up table is set as a table recording "transformation overwriting data" serving as entity data of
  (a) transformation data
  (b) transformation data with identification mark
  and writing position specification information of the data.

While various settings can be made regarding how frequently transformation data (including transformation data with identification mark) replacement regions are to be set, and the size of the transformation data, the fix-up table size differs according to the settings. For example, in a configuration wherein two sets of transformation data or transformation data with identification marks are to be set per 1 GOP (Group Of Pictures) configuring MPEG content, for example, in the event that the transformation data (including transformation data with identification mark) is 8 bytes, the table would have a table size of around 400 KB, and in the case of 16 bytes a table of around 600 KB.

Also, with a configuration wherein five sets of transformation data or transformation data with identification marks are to be set per 1 GOP (Group OF Pictures) configuring the MPEG content, in the event that the transformation data (including transformation data with identification mark) is 8 bytes, the table would have a table size of around 1 MB, and in the case of 16 bytes a table of around 1.5 MB.

Processing for Writing (a) transformation data (b) transformation data with identification mark to specified positions in the fix-up table is performed by the secure VM of the host 350, following the fix-up table 314 recorded in the information recording medium 310. Data writing is performed as overwriting processing of transformation data or transformation data with identifying marks onto data stored in the plaintext TS buffer 253, and as a result of this processing, the data stored in the plaintext TS buffer 253 is replaced with the data in FIG. 8(3) described earlier.

External output of content from the player (information processing device such as a PC) mounting the host, or content reproduction, is executed as processing based on the transformed data shown in FIG. 8(3).

The transformation data is the proper content configuration data, and the transformation data with identifying marks is also data applied to reproduction of the proper content, so proper content reproduction is enabled by decoding reproduction based on these data. Also, in the event that this content is copied in an unauthorized manner, for example, and copied data leaks out in great numbers, analyzing the transformation data with identifying marks enables the player ID to be obtained, hereby enabling pinpointing of the source of the unauthorized content data.

(3.2) Content Reproduction Processing Example 2

Next, a content reproduction processing example 2 will be described with reference to FIG. 10. FIG. 10 illustrates, from the left, an information recording medium 310 storing encrypted contents, a drive 330 into which the information recording medium 310 is set so as to execute data reading, and a host 350 which is connected with the drive so as to be capable of data communication, and which obtains the content stored in the information recording medium 310 by the drive 330 and executes a reproduction application which executes reproduction processing thereof. The host 350 is executed by an information processing device such as a PC, for example.

The MKB (Media Key Block) and title key file recorded in the information recording medium 310 are omitted from FIG. 10. The host 350 holds a device key to be applied to MKB processing, and the title key (Kt) is calculated by performing exactly the same processing as that described with reference to FIG. 6, applying the MKB (Media Key Block) recorded in the information recording medium 310 and the title key file. This processing is also omitted from FIG. 10. The information recording medium further stores encrypted content 313, fix-up tables 314, and the data transformation processing program 315.

In the content reproduction processing example 2 shown in FIG. 10, a feature thereof is that the processing of the block 381 indicated with a dotted line frame is executed as real-time processing, and the processing of the block 382 is executed as batch processing before reproducing or outputting the content. That is to say, the secure VM 356 reads out the data transformation processing program 315 including the command code information from the information recording medium 310 before starting content reproduction or external output of content, and executes the decryption processing of the fix-up table 314 read out from the information recording medium 310, based on the input of player information 355, under the control of the event handler 354.

The fix-up table 314 recorded in the information recording medium 310 is subjected to obfuscation processing by, for example, AES encryption, exclusive-OR operation, or other like computation, and the secure VM 356 performs decryption processing or predetermined computation processing following the data transformation processing program 315, thereby obtaining the fix-up table as plaintext data. The processing so far is executed as batch processing before starting content reproduction or external output of the content.

Subsequent processing is executed as real-time processing performed in parallel with the content reproduction or external output processing of the content. That is to say, the content decryption processing in step S201, the data transformation processing in step S202, i.e., the data transformation processing for writing the transformation data recorded in the fix-up table recorded in the information recording medium 310, that is, (a) transformation data (b) transformation data with identification mark to a specified position recorded in the fix-up table 314, and further, external output processing of the transformed TS (transport stream) or demultiplexer processing in step S203, i.e., conversion from a transport stream (TS) to an elementary stream (ES), and the decoding processing in step S204, are all executed as real-time processing parallel with the content reproduction or external output processing of the content.

With such a processing sequence, even in the event of cases wherein processing of the fix-up table 314 by the secure VM 356 takes time, real-time processing is realized without affecting reproduction and external output of the content.

4. Message Display and Content Usage Control Processing

As described above, with a configuration wherein content including broken data differing from proper content configuration data is recorded in an information recording medium, and further, transformation data which is proper content configuration data to be replaced with the broken data, and fix-up tables recording the set position information of the transformation data as to the content are stored in the information recording medium, and a configuration wherein content configuration data is replaced with the transformation data at the time of content reproduction processing following the fix-up tables recorded in the information recording medium, content reproduction is not executed at devices which cannot obtain the transformation data even in the event that the secret key corresponding to the encrypted content recorded in the information recording medium leaks out, thereby preventing unauthorized usage of content.

Also, transformation data, including data of which configuration bits of identification information enabling identification of the content reproducing device or content reproduction application can be analyzed, is applied as the transformation data, so even in the event that unauthorized content leaks out, analyzing the transformation data enables the source of the unauthorized content to be determined.

Thus, strict content usage restriction can be realized. However, on the other hand, in the event that reproduction of content is forbidden by the above-described content protection function, a user attempting to reproduce or use the content has no way of knowing the reason why the content is not reproduced, nor can know a solution to reproduce the content. There is the possibility that the user will conclude that the reason is malfunctioning equipment or a defective disk.

Also, the content protection mechanism which applies the above-described data transformation is configured primarily as a protection mechanism for AV streams of large contents such as certain movies and so forth, and there is the problem that with small contents processed by programs such as Java (registered trademark) that are not such large contents, the processing load for setting transformation data is great.

The following is a description of a configuration example enabling message presentation to a user and input of confirmation from the user, as ways of handling cases wherein content reproduction forbidding processing has been executed, and a simple content usage restriction configuration for small contents processed by Java (registered trademark), for example, as configurations for solving such problems.

(4.1) Message Display Using UI (User Interface) Processing Unit

First, a message display processing example using a UI (user interface) processing unit will be described. FIG. 11 illustrates, from the left, an information recording medium 310 storing encrypted contents, a drive 330 into which the information recording medium 310 is set so as to execute data reading, and a host 350 which is connected with the drive so as to be capable of data communication, and which obtains the content stored in the information recording medium 310 by the drive 330 and executes a reproduction application which executes reproduction processing thereof. The host 350 is executed by an information processing device such as a PC, for example.

FIG. 11 is a diagram wherein a message displaying processing function has been added to the content reproduction processing configuration example described with reference to FIG. 6. That is to say, the difference with FIG. 6 is the configuration in that a message data file 316 is stored in the information recording medium 310, and the secure VM 356 at the host side 350 uses the UI (user interface) processing unit 391 to display message on the display unit 392.

A host having valid content usage rights will succeed in decrypting the encrypted content 313, and correct content reproduction will be performed by data transformation applying the transformation data obtained from the fix-up table 314. Also, a host without valid content usage rights will fail in at least one of the content decryption processing or the data transformation processing based on transformation data, and accordingly cannot perform correct content reproduction. These processes are the same as the processing described earlier with reference to FIG. 6.

With the present embodiment, the secure VM 356 functions as a security information processing unit, determines output messages based on security check information in the content reproduction sequence, and outputs message output commands accompanied by output message selection information to the UI (user interface) processing unit 391.

The UI (user interface) processing unit 391 obtains message information based on selection information input from the secure VM 356 serving as the security information processing unit, from the message data file 316 of the information recording medium 310, and outputs (displays) this on the display unit 392 which is the display of the PC or the like executing the host. The display unit 392 displays the message which the UI (user interface) processing unit 391 outputs. This display is performed as a display superimposed on the reproduction content, for example.

The UI (user interface) processing unit 391 can be made to have a configuration applying OSD (on-screen display) functions, for example. OSD has a function of performing interruption display of warning messages, display adjusting screens, etc., superimposed on the display information displayed on the display unit 392. Processing is performed independent from the processing of the host 350 in parallel, and message display can be performed on the display unit 392 and also receive user input via an unshown input unit. With the present embodiment, the user input is input from the UI (user interface) processing unit 391 to the secure VM 356.

A specific example will be described. The secure VM 356 determines an output message based on the security check information in the content reproduction sequence, and outputs to the UI (user interface) processing unit 391 message output commands accompanied by selection information of the output message. The UI (user interface) processing unit 391 obtains the message information based on the selection information from the message data file 316 of the information recording medium 310, and outputs (displays) this to the display unit 392 which is the display of the PC or the like executing the host.

Figure 12:
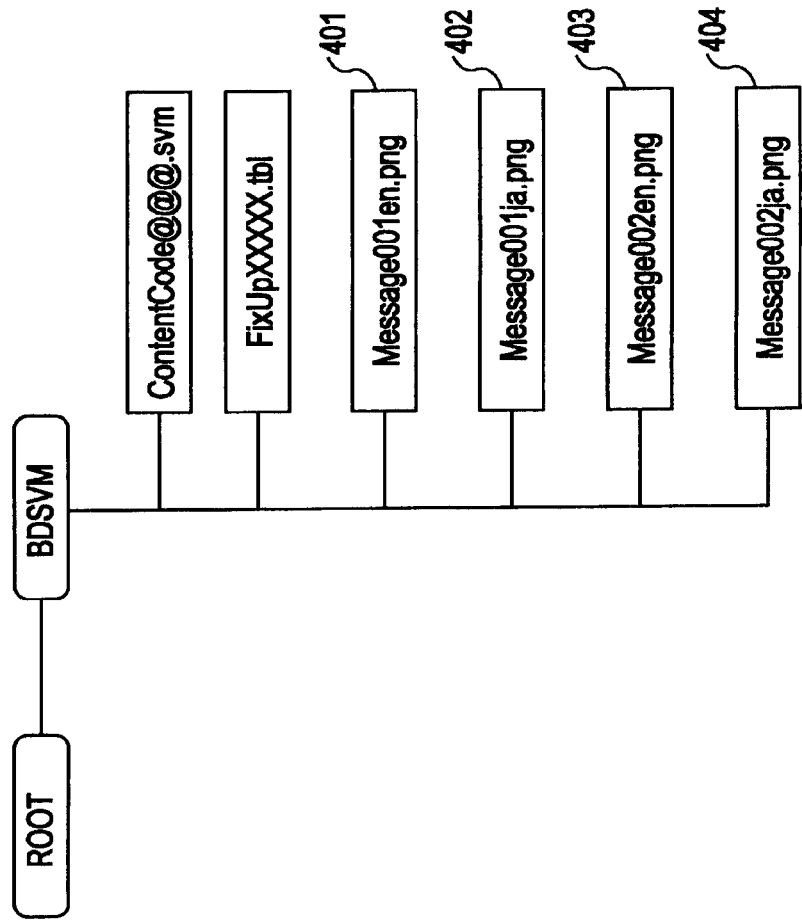
FIG. 12 is a diagram describing a message data file directory setting example.

FIG. 12 is a diagram illustrating a directory including message data files 401 through 404, recorded in the information recording medium. As shown in FIG. 12, message data files 401 through 404 of various contents and languages are stored in the information recording medium.

As described above, the secure VM 356 inputs the ID information or the like of the player (information processing device) executing the host application as player information 355, and also inputs monitoring information from the event handler 354. The event handler 354 performs emulator checking regarding whether or not processing performed by the secure VM 356 is being performed properly, and the processing and status of other host applications and players (information processing devices) serving as host application execution equipment, is monitored, and in the event that a processing error or unauthorized processing or the like is detected, monitoring information is input to the secure VM, and the data transformation processing by the secure VM 356 is cancelled if necessary.

Based on the player information 355 for example, the secure VM 356 determines the language of the message to be output, and also performs processing for determining the content of the message to be output, based on the monitoring information from the event hander 354. Message selection information corresponding to the message data file having the language and contents thus determined is determined and output to the UI (user interface) processing unit 391.

Based on this selection information, the UI (user interface) processing unit 391 selects and obtains from the message data file 316 in the information recording medium 310, and outputs (displays) the message data on the display unit 392 which is the display of the PC or the like executing the host.

In the event of applying OSD (on-screen display) functions as the UI (user interface) processing unit 391, the OSD call (CALL_OSD) function is used for the message display command accompanied by the message selection information from the secure VM 356 serving as the security information processing unit to the UI (user interface) processing unit 391. An OSD call (CALL_OSD) function is defined as a command having both specification information of the following (a) and (b):

(a) number specification information for specifying a message data file (num), and (b) an operation ID specifying user input information (opID).

Figure 13:
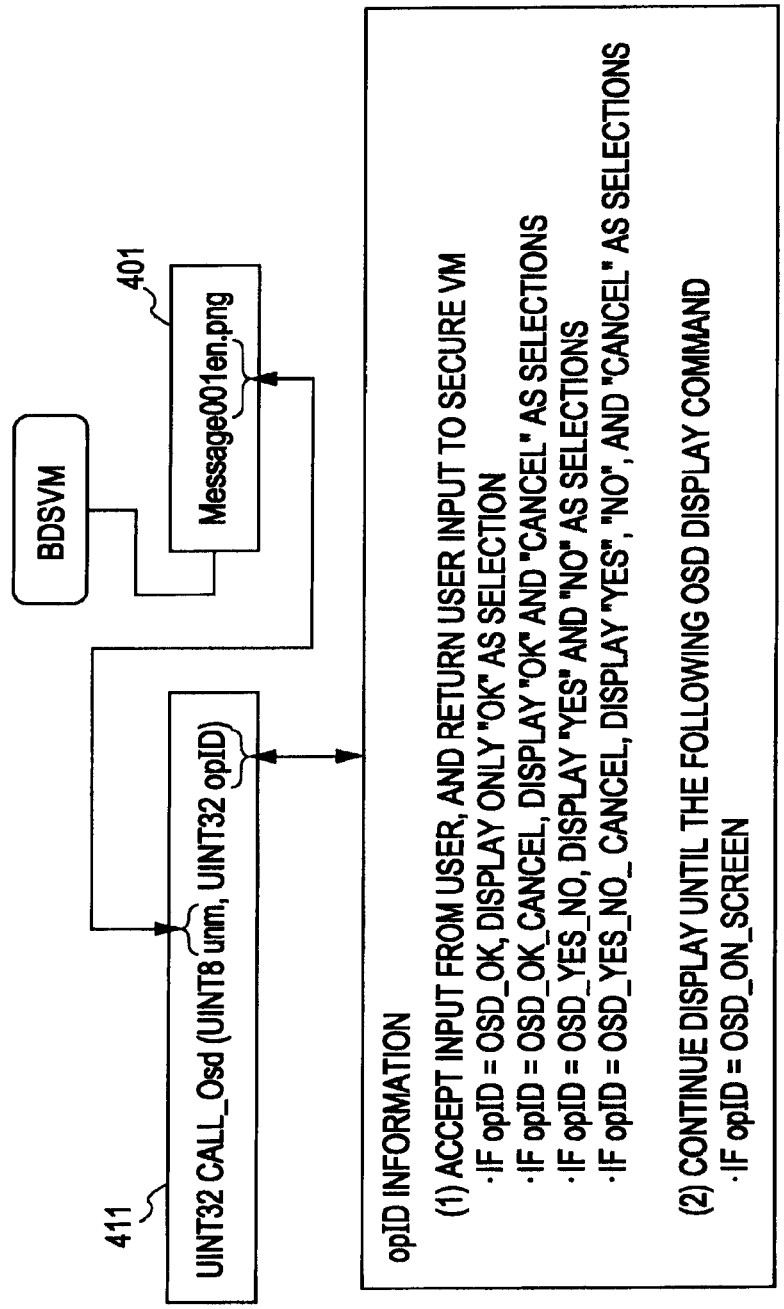
FIG. 13 is a diagram describing the configuration of commands corresponding to an OSD call (CALL_OSD) applied to the message display processing under an OSD function.

A specific example of message display processing using OSD call (CALL_OSD) will be described with reference to FIG. 13. For example, specification information of (a) number specification information for specifying a message data file (num), and (b) an operation ID specifying user input information (opID)

are set for the command 411 corresponding to the OSD call (CALL_OSD).

Number specifying information (num) is used as specifying information for the message data file stored in the information recording medium, described above with reference to FIG. 13. Also, the operation ID (opID) is used as setting information for displaying, as a part of the user input unit, display of [OK] alone,
display of [OK], [Cancel]
display of [Yes], [No],
display of [Yes], [No], [Cancel]

according to each ID as shown in 14, or setting simply continuity to display a message alone.

Figure 14:
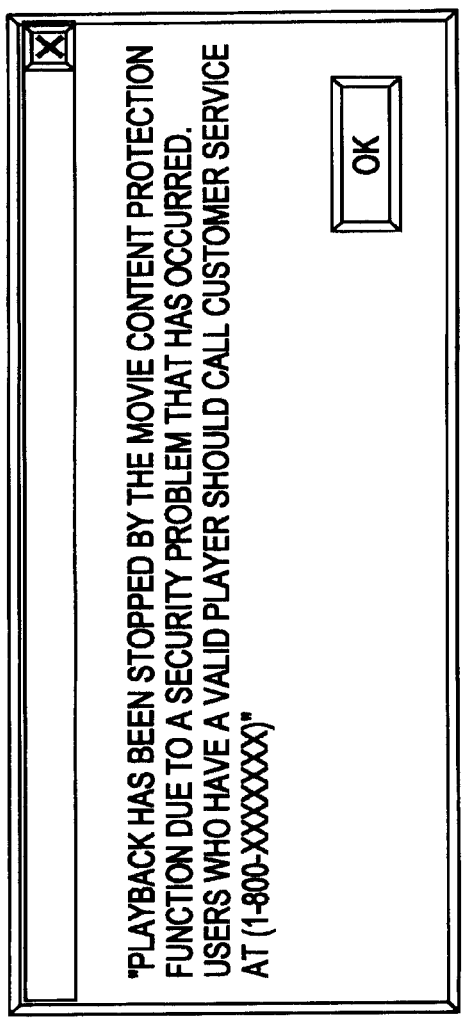
FIG. 14 is a diagram illustrating a message display example on the display unit.

FIG. 14 shows a message display example wherein [OK] is displayed as the user input unit. In the event of applying the OSD (on-screen display) functions as the UI (user interface) processing unit 391, message data such as shown in FIG. 14, for example, is displayed on the front of the display unit 392.

Input information is detected through the OSD by the user using a mouse for example to click on the [OK] button of the display message, and input to the secure VM 356. Note that an arrangement may be made wherein the URL of a content providing server or content managing server or the like is provided in the display message, such that the user can access the servers by clicking on the URL.

Performing such presentation of messages enables the secure VM to output appropriate messages to the display unit according to the situation, even in the event that decryption of content or correct data transformation cannot be performed, for example, so that the content cannot be reproduced correctly, meaning that the user can grasp the situation, and also, information such as procedures necessary for content reproduction can also be provided.

Also, a configuration may be made wherein the user input information is not simple data such as the [OK], [Cancel], [Yes], [No] described with reference to FIG. 13 and FIG. 14, but rather wherein numbers or a text string such as a certain password is input, the secure VM 356 receives the input value, performs determination regarding whether this satisfies reproduction conditions by password confirmation processing, and in the event that determination is made that this satisfies the reproduction conditions, processing is performed to enable reproduction, or the like.

(4.2) Message Display and Content Usage Control Processing Using Registers

Next, an example of message display, and further, content usage control processing, using registers, will be described.

Figure 15:
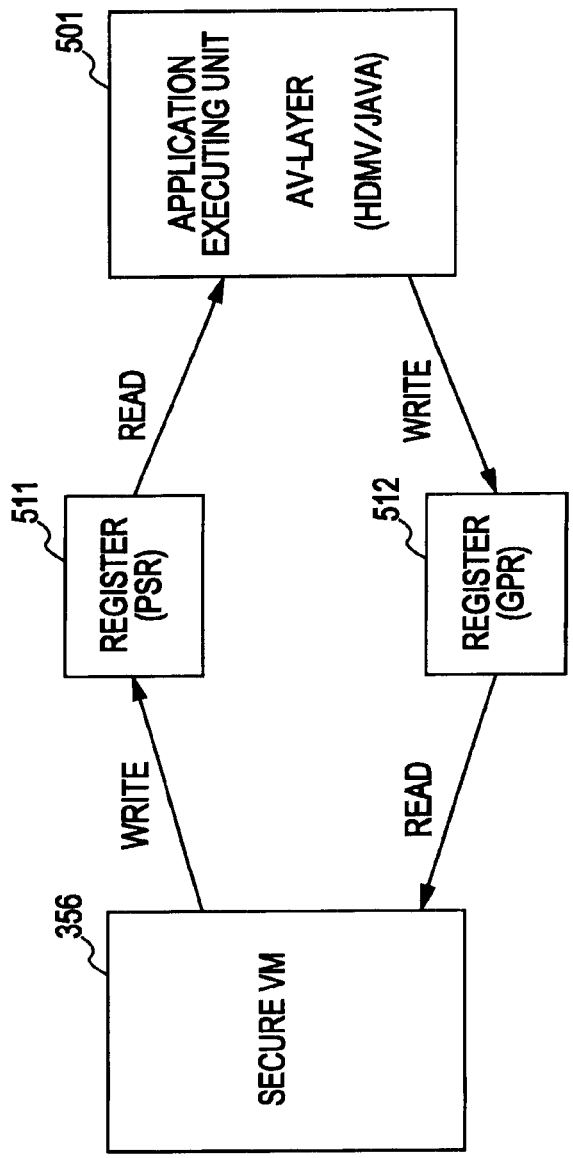
FIG. 15 is a diagram illustrating the basic configuration for realizing message display processing, and further, content usage control processing, using registers.

FIG. 15 illustrates the basic configuration for realizing message display processing, and further, content usage control processing, using registers. The secure VM 356 shown in FIG. 15 is the same secure VM 356 as the secure VM 356 described with reference to FIG. 6, FIG. 10, and FIG. 11. That is to say, this is the secure VM 356 set in the host for executing the data transformation processing as a virtual machine, serving as a security information processing unit.

The secure VM 356 serving as a security information processing unit performs processing for reading the data transformation processing program 315 including command code information from the information recording medium 310 and executing the same, as described with reference to FIG. 6 and other drawings. Further, the secure VM 356 inputs the ID information of the player (information processing device) executing the host application as player information 355, and inputs monitoring information from the event handler. The event handler 354 performs emulator checking regarding whether or not processing performed by the secure VM 356 is being performed properly, and the processing and status of other host applications and players (information processing devices) serving as host application execution equipment, is monitored, and in the event that a processing error or unauthorized processing or the like is detected, monitoring information is input to the secure VM 356, and the data transformation processing by the secure VM 356 is cancelled if necessary.

With the present processing example, messages, commands, parameters, data, etc., are transferred between the secure VM 356 serving as a security information processing unit and the application executing unit 501, using registers. The application executing unit 501 is the data processing executing unit at the application layer (or also called AV layer), with application process executing various types of data processing being included in the applications executed at this application executing unit 501.

With the information processing device such as a PC or the like for executing content reproduction processing by the host 350 described with reference to FIGS. 6, 10, and 11, various types of application programs are executed. For example, the UI function providing program for providing UI functions to the display unit of the information processing device such as a PC or the like so as to display various types of messages and to receive user input, as described earlier in section (4.1), application programs for executing Java (registered trademark) or HDMV contents stored in the information recording medium, and so forth, are executed. Note that these application programs may be either programs which the information processing device has stored in a hard disk or the like beforehand, or programs read out from an information recording medium.

Along with storing AV streams such as movies or the like for example, the information recording medium may also store small contents such as games, pictures, moving images contents, and so forth, under settings or the like of freebie contents or the like. Many of such contents are recorded as Java (registered trademark) or HDMV contents. Unlike the AV contents subjected to the above-described encryption processing or data transformation processing, these small contents are seldom subjected to content protection such as encryption processing or data transformation processing.

However, unauthorized copying and usage is undesirable even for such small contents. With the present processing example, content usage control is realized for such contents as well, applying the configuration using registers, as shown in FIG. 15.

As shown in FIG. 15, messages, commands, parameters, data, etc., are transferred between the secure VM 356 and the application executing unit 501, using registers 511 and 512. In the example shown in FIG. 15, an example is shown wherein the register (PSR) 511 is used as the write register for the secure VM 356 and the read register for the application executing unit 501, and the register (GPR) 512 is used as the read register for the secure VM 356 and the write register for the application executing unit 501. Already-available registers are used in this configuration, with the register (PSR) 511 being a player status register, and the register (GPR) 512 being a general-purpose register. Note that the usage configuration of the registers shown is only an example, and any registers can be applied as long as data can be exchanged between the secure VM 356 and the application executing unit 501.

(4.2.1) Execution Example of UI Function Providing Application Using Registers

First, a processing example for a case wherein an application to be executed at the application layer is set as a UI function providing application in the register usage configuration shown in FIG. 15, will be described with reference to FIG. 16.

Applications normally executed at the application layer are application programs for executing Java (registered trademark) or HDMV contents, for example, stored in the information recording medium. In the present processing example, these applications are made to execute UI functions. That is to say, applications executed in the application layer are set as a UI function providing application executing unit 521.

Figure 16:
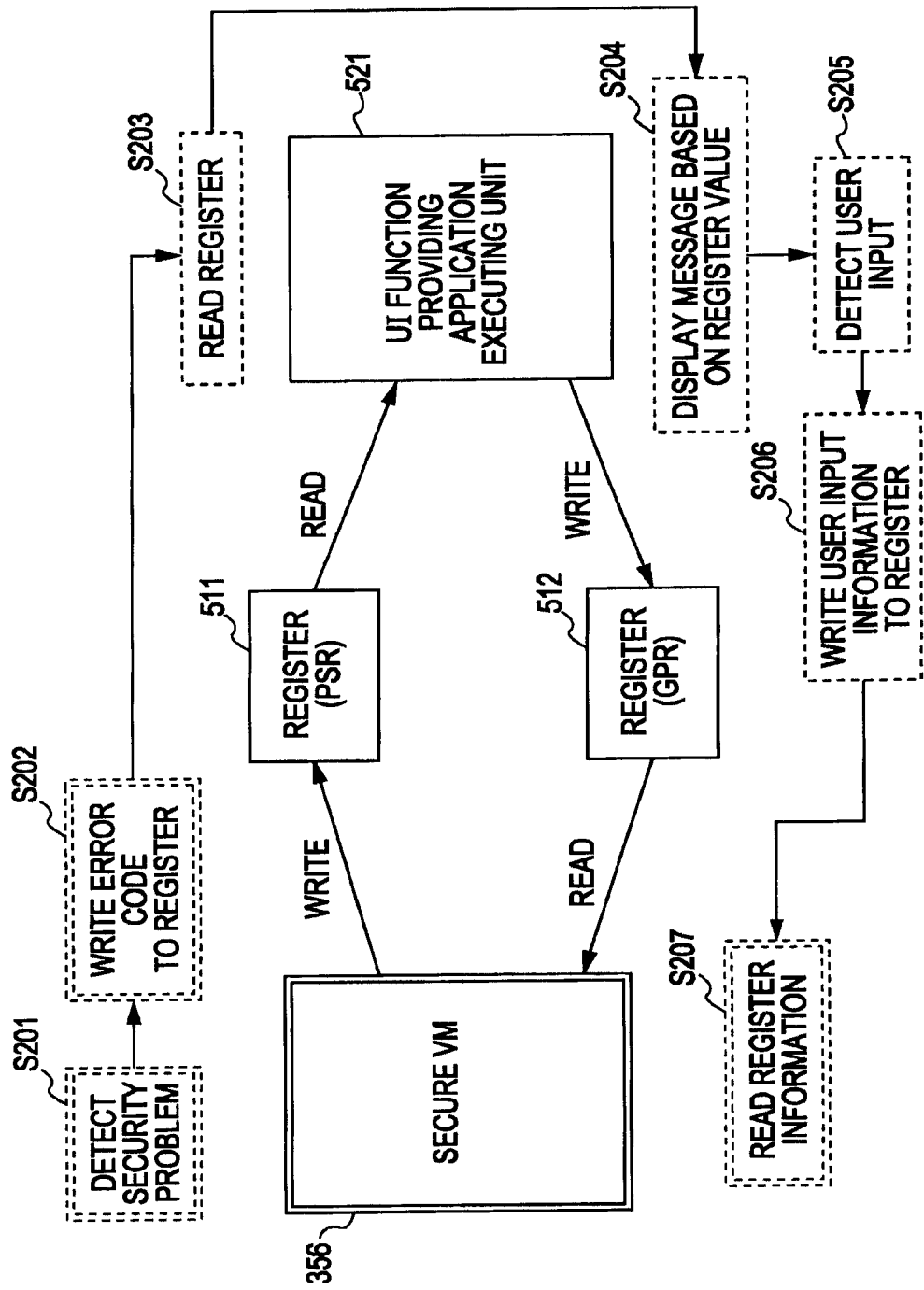
FIG. 16 is a diagram describing the processing sequence for message display processing using registers.

FIG. 16 illustrates the secure VM 356 functioning as the security information processing unit, the UI function providing application executing unit 521, and the registers 511 and 512, showing the processing steps S201 through S207 which the secure VM 356 and the UI function providing application executing unit 521 execute. The processing at each step will be described.

First, let us say that the secure VM 356 has detected some sort of security problem in the content reproduction processing in step S201. As described earlier with reference to FIG. 6 and other drawings, the secure VM 356 receives the monitoring information from the event handler 354, and in the event of detection of a processing error or unauthorized processing or the like, such information is input to the secure VM 356.

In the event that an error such as some sort of security program is detected in the content reproducing processing, the secure VM 356 writes an error code set corresponding to each error beforehand to the register (PSR) 511 in step S202.

Next, in step S203, the UI function providing application executing unit 521 obtains the error code written to the register (PSR) 511. The UI function providing application executing unit 521 executes processing for referencing the register (PSR) 511 at intervals set beforehand, for example. Following obtaining the error code written to the register (PSR) 511, the UI function providing application executing unit 521 outputs the message set corresponding to the obtained error code to the display unit in step S204.

The message data displayed at the display unit is display data wherein a message and user input unit have been set, as described earlier with reference to FIG. 14, for example. In step S205, upon the UI function providing application executing unit 521 detecting user input, in step S206, the UI function providing application executing unit 521 writes the user input information to the register (GPR) 512. Further, in step S207, the secure VM 356 obtains the user input information written to the register (GPR) 512. The secure VM 356 periodically checks the register (GPR) 512, and repeats the register check until write information is obtained, or until a predetermined timeout time is reached.

The processing configuration shown in this FIG. 16 is a configuration wherein message presentation to the user and detection of user input has been enabled by applying the display unit, by the secure VM 356 and the UI function providing application executing unit 521 performing input/output of information via the register. Performing such presentation of messages enables the secure VM to output appropriate messages to the display unit according to the situation via the registers and application, even in the event that decryption of content or correct data transformation cannot be performed, for example, so that the content cannot be reproduced correctly, meaning that the user can grasp the situation, and also, information such as procedures necessary for content reproduction can also be provided.

Figure 17:
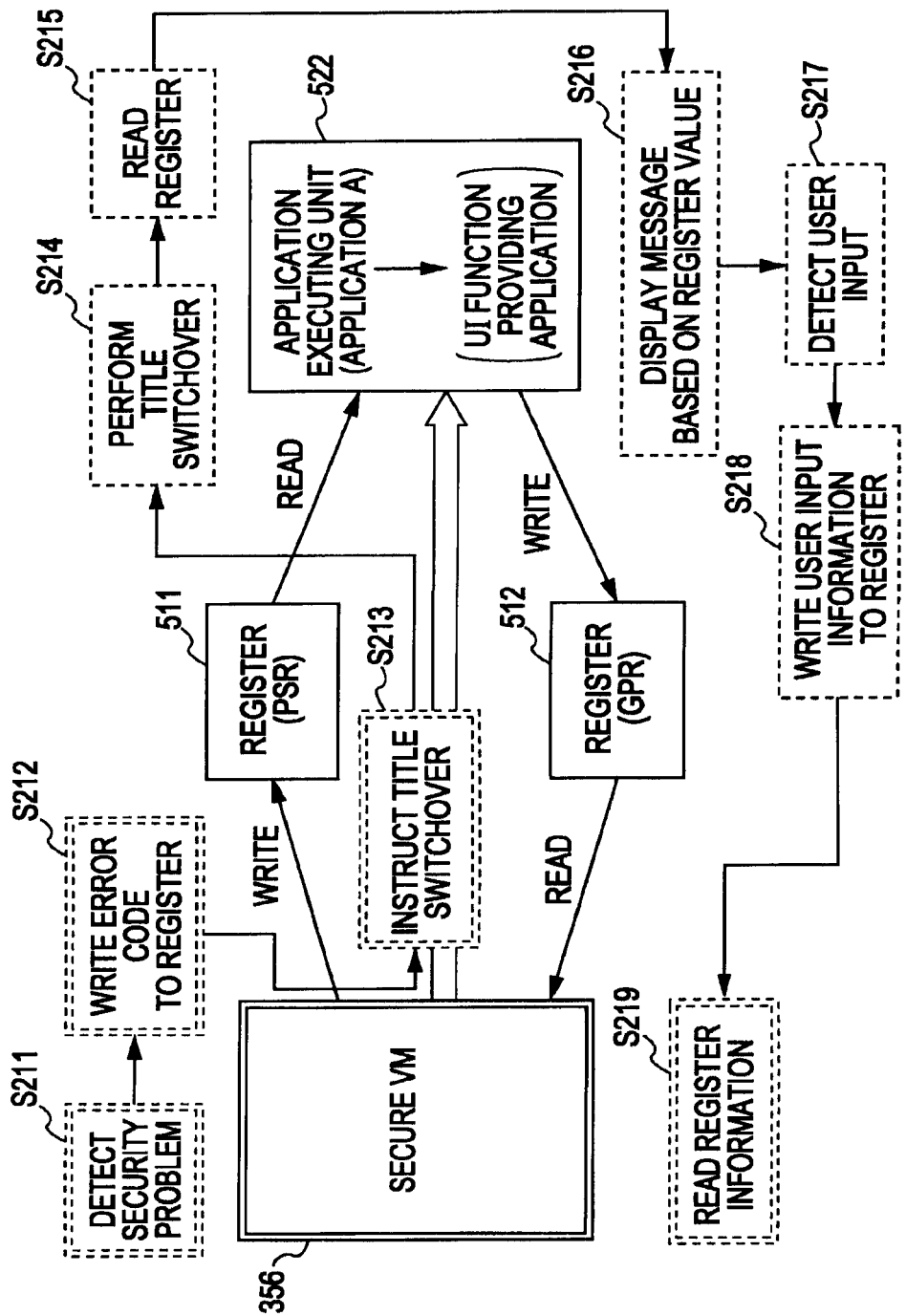
FIG. 17 is a diagram describing the processing sequence for message display processing using registers, applying title switchover processing.

(4.2.2) UI Function Providing Example by Usage of Registers and Title Switchover Next, a processing example wherein the secure VM 356 serving as the security information processing unit outputs a title switchover command to the application layer, to switch the title of a program being executed at the application layer over to a UI function providing application such as message presentation, thereby presenting messages and receiving user input, with reference to FIG. 17.

FIG. 17 shows the secure VM 356 serving as the security information processing unit, the application executing unit 522, and the registers 511 and 512. with the present processing example, the secure VM 356 executes processing for outputting a title switchover command to the application executing unit 522, so as to switch the title of the program being executed at the application executing unit 522 over to a UI function providing application such as message presentation. Accordingly, the application executing unit 522 indicates an application layer wherein various application programs such as an application A other than the UI function providing application, and the UI function providing application, are executed.

The processing sequence executed at the secure VM 356 and the application executing unit 522 is shown as the processing steps S211 through S219. The processing at each step will be described.

First, in step S211, the secure VM 356 detects some sort of security problem in the content reproduction processing. As described earlier with reference to FIG. 6 and other drawings, the secure VM 356 receives the monitoring information from the event handler 354, and in the event of detection of a processing error or unauthorized processing or the like, such information is input to the secure VM 356. In the event that an error such as some sort of security program is detected in the content reproducing processing, the secure VM 356 writes an error code set corresponding to each error beforehand to the register (PSR) 511 in step S212.

Next, in step S213, the secure VM 356 outputs a title switchover instruction to the application executing unit 522. This title switchover instruction is an instruction command to switch the title of the program being executed at the application executing unit 522 over to a UI function providing application such as message presentation. In step S214, the application executing unit 522 executes title switchover processing of the application begin executed, in accordance with the title switchover command from the secure VM 356 and executes the UI function providing application.

Subsequent processing is the same processing as that described with reference to FIG. 16 earlier, with the UI function providing application at the application executing unit 522 obtaining the error code written to the register (PSR) 511 in step S215, and outputting the message set corresponding to the obtained error code to the display unit in step S216.

Further, upon detection of user input in step S217, the user input information is written to the register (GPR) 512 in step S218. Further, in step S219, the secure VM 356 obtains the user input information written to the register (GPR) 512.

The processing configuration shown in this FIG. 17 is a configuration wherein the secure VM 356 serving as the security information processing unit has authority to switchover applications being executed at the application executing unit 522, with a UI function providing application being executed at the application layer by this application switchover, thereby enabling presenting of messages to the user and detection of user input.

With the present configuration, processing such as register checks is performed only at the UI function providing application, so there is no need to make settings for performing register checking with other normal applications, which is advantageous in that there is no need for making changes to general applications executed in the application layer.

(4.2.3) Content Usage Control Example by Usage of Registers

Next, a content usage control processing example using registers will be described with reference to FIG. 18. As described earlier, the content protection mechanism which applies the above-described data transformation is configured primarily as a protection mechanism for AV streams of large contents such as certain movies and so forth, and there is the problem that with small contents processed by programs such as Java (registered trademark) that are not such large contents, the processing load for setting transformation data is great. The following is a description of a content usage control processing configuration of small contents processed by such as Java (registered trademark) or HDMV, for example, using registers.

Figure 18:
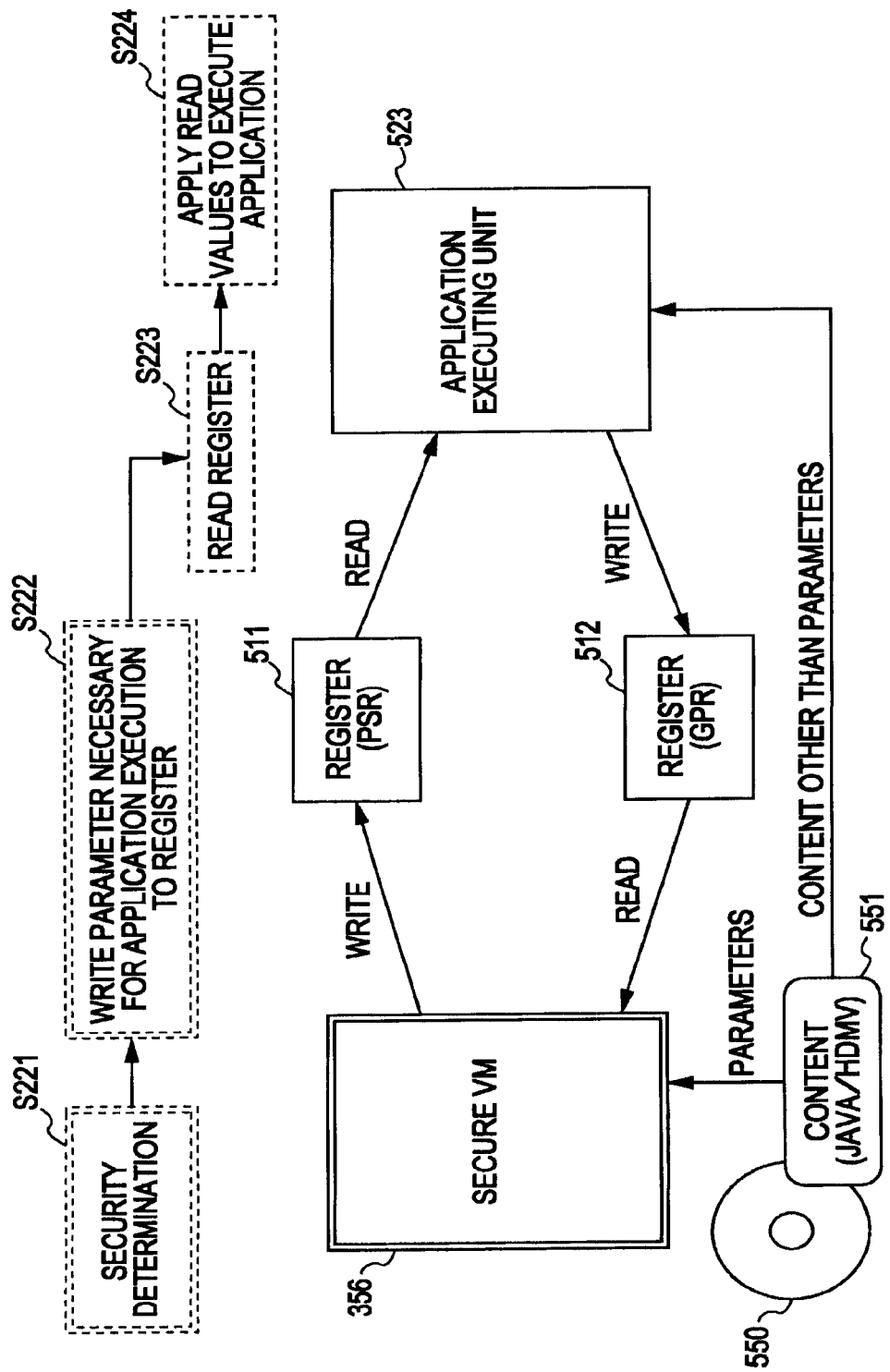
FIG. 18 is a diagram describing the processing sequence for usage control processing using registers.

FIG. 18 shows the secure VM 356 serving as the security information processing unit, an application executing unit 523 for executing small contents processed by such as Java (registered trademark) or HDMV for example, and the registers 511 and 512. The application executing unit 523 is small content 551 processed by such as Java (registered trademark) or HDMV, stored in the information recording medium 550 along with AV content, as shown in the drawing.

The small content 551 processed by such as Java (registered trademark) or HDMV that has been read out from the information recording medium 550 has particular processing parameters necessary for content execution, in order to realize usage control, and the secure VM 356 obtains these parameters. The application executing unit 523 obtains the content entity configured of Java (registered trademark) or HDMV not containing processing parameters, and executes reproduction processing. Note however, that processing parameters must be obtained from the secure VM 356 for reproduction processing of the content.

The secure VM 356 provides the processing parameters to the application executing unit 523 via the register (PSR) 511 at every certain content reproduction section for example, and in the event that some sort of security problem has been detected at the secure VM 356, providing of parameters is stopped. Stopping providing of parameters means that the application executing unit 523 cannot reproduce content anymore and content reproduction is stopped. With the present processing example, content usage control is realized by such a configuration.

The application (content 551) to be executed at the application executing unit 523 is an application such as Java (registered trademark) or HDMV, these applications intermittently obtain parameters (P1, P2, P3 . . . ) necessary for executing or continuing application execution before starting the application and while executing, via the register (PSR) 511.

For example, the application executing unit 523 generates display content data by exclusive-OR operation processing applying the parameters obtained from the register (PSR) 511, encryption processing applying the parameters, or decryption processing using an encryption key generated by encryption processing applying the parameters.

The parameters P1, P2, P3 . . . are parameters which differ for each predetermined program execution unit or content presentation unit of the application (content 551) executed at the application executing unit 523, with the application executing unit 523 sequentially obtaining the parameters P1, P2, P3 from the register (PSR) 511 each predetermined interval, and performing computation or encryption processing applying these obtained parameters.

For example, the parameters P1, P2, P3 are set as encryption parameters or computation parameters for partial contents section in display-time units of the content presented by the application executed at the application executing unit 523. For example, the setting is made such that different parameters must be sequentially obtained from the register (PSR) 511 and processing executed, each content presentation time period, in order to present the content, such as presentation of the content portion for time t1 through t2 needs computation processing of content description processing applying the parameter P1, Presentation of the content portion for time t2 through t3 needs computation processing of content description processing applying the parameter P2, Presentation of the content portion for time t3 through t4 needs computation processing of content decryption processing applying the parameter P3, and so forth.

For example, the proper content is obtained by an exclusive-OR (XOR) operation of the content 511 configuration data and the parameters (P1, P2, P3 . . . ). Or, different decryption keys are sequentially generated by processing applying the parameters (P1, P2, P3 . . . ), and these decryption keys are applied to sequentially executed decryption of the partial contents, thereby enabling continuation of content presentation.

The secure VM 356 sequentially stores in the register (PSR) 511 the parameters (P1, P2, P3 . . . ) which differ for each content presentation section executed at the application executing unit 523, with the application being executed at the application executing unit 523, e.g., Java (registered trademark) or HDMV program, periodically obtaining the parameters P1, P2, P3 from the register (PSR) 511, and performing computation or encryption processing applying these obtained parameters, necessary for execution and continuation of the application.

In the event that some sort of security problem has been detected at the secure VM 356, providing of parameters is stopped. Stopping providing of parameters means that the application executing unit 523 cannot reproduce content anymore and content reproduction is stopped. With the present processing example, content usage control is realized by such a configuration.

Note that an arrangement may be made wherein the application executing unit 523 is of a configuration for sending messages to the secure VM 356 via the register 512 (GPR) periodically, so as to write a parameter request message to the register 512 (GPR) every timing at which a new parameter needs to be obtained for example, and the secure VM 356 writing parameters to the register (PSR) 511 in response to the parameter request written to the register 512 (GPR).

The content usage control processing sequence will be described with reference to FIG. 18. The processing sequence executed at the secure VM 356 and the application executing unit 523 is shown as the processing steps S221 through S224. The processing at each step will be described.

First, in step S221, the secure VM 356 serving as the security information processing unit determines whether or not there is a security problem. As described earlier with reference to FIG. 6 and other drawings, the secure VM 356 receives the monitoring information from the event handler 354, and in the event of detection of a processing error or unauthorized processing or the like, such information is input to the secure VM 356. In the event that no security problem is detected in particular, the secure VM 356 writes a parameter necessary for execution of the application to the register (PSR) 511.

Next, in step S223, the application executing unit 523 obtains the parameter written to the register (PSR) 511, and in step S224, executes the application using the value read from the register.

Parameter writing to the register (PSR) 511 by the secure VM 356 is executed periodically, with the application executing unit 523 periodically obtaining the parameters written to the register (PSR) 511, and executing the application using the obtained parameters.

For example, the secure VM 356 sequentially stores in the register (PSR) 511 the parameters (P1, P2, P3 . . . ) which differ for each content reproduction section executed at the application executing unit 523, with the application being executed at the application executing unit 523, e.g., Java (registered trademark) or HDMV program, periodically obtaining the parameters (P1, P2, P3 . . . ) from the register (PSR) 511, and performing computation or encryption processing applying these obtained parameters from the register (PSR) 511, necessary for execution and continuation of the application.

In the event that a security problem such as unauthorized processing has been detected at the secure VM 356, the secure server 356 stops writing of parameters to the register (PSR) 511. Stopping writing of parameters means that the application executing unit 523 fails to obtain parameters from the register (PSR) 511, and accordingly cannot perform application execution using the parameters, and content reproduction is stopped.

As described above, with the present processing example, content usage control is realized by a simple configuration, i.e., a simple configuration of providing parameters from the secure VM to the application, for small content processed by e.g., Java (registered trademark) or HDMV, which do not have content protection functions such as the above-described encryption or data transformation.

Note that with the present processing example, in the event that a security problem occurs and reproduction of content is stopped, the reason why content reproduction has been stopped can be notified to the user by the message presenting processing described earlier.

Figure 19:
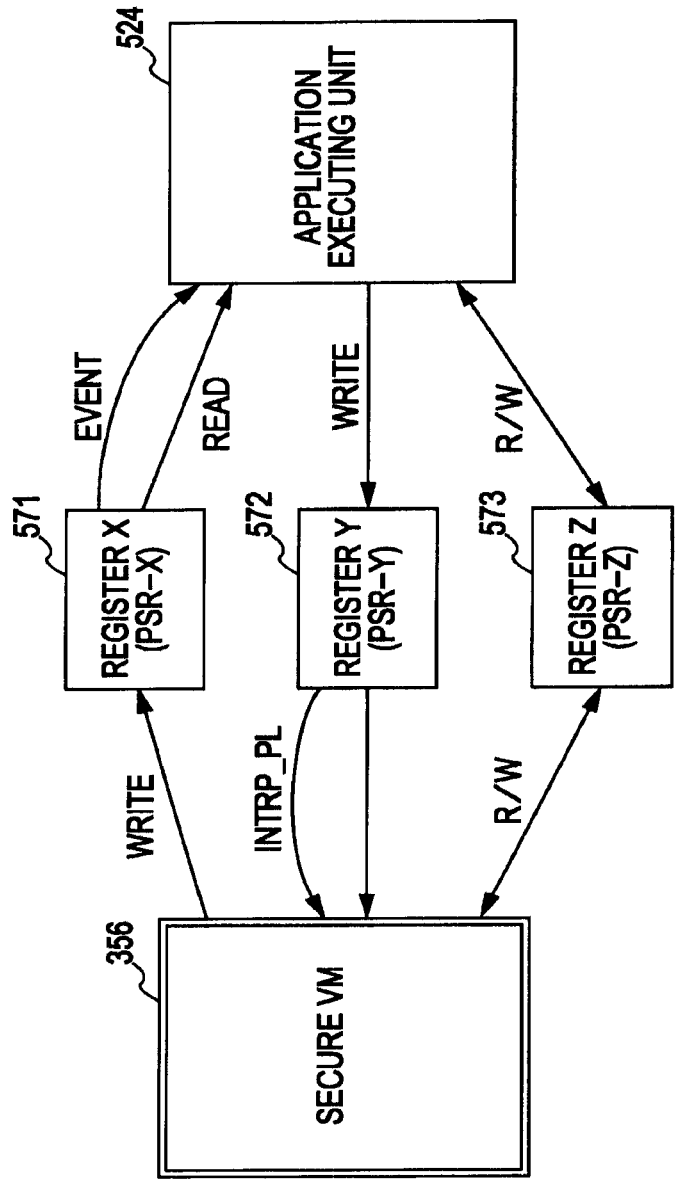
FIG. 19 is a diagram describing a configuration example for data transfer between the secure VM and application executing unit by using registers used by the application executing unit.

(4.2.4) Processing Example 1 Employing Registers Used by Application Executing Unit Next, a configuration example enabling message presentation and reception of user input, and further, reliability confirmation processing between the secure VM 356 and the application executing unit, by a configuration wherein apart of the registers used by the application executing unit being read/write enabled for use by the secure VM 356 serving as the security information processing unit, will be described with reference to FIG. 19.

FIG. 19 shows the secure VM 356 serving as the security information processing unit, an application executing unit 524 set at the AV-Layer for example, and three registers, register X (PSR-X) 571, register Y (PSR-Y) 572, and register Z (PSR-Z) 573.

The register X (PSR-X) 571 is a register where the secure VM 356 executes write and the application executing unit 524 executes read. Upon the secure VM 356 executing a write action to the register X (PSR-X) 571, an event notification based on the change at the register X (PSR-X) 571 is made to the application executing unit 524, whereby the application executing unit 524 can know that a write action has been executed to the register X (PSR-X) 571.

The application executing unit 524 which, for example, presents messages, and executes an application such as Java (registered trademark) or HDMV or the like, checks the register X (PSR-X) 571 as soon as it receives the notification that a write action has been executed to the register X (PSR-X) 571, and performs processing such as displaying a warning message in response to the value.

Also, the register Y (PSR-Y) 572 is a register to which the application executing unit 524 executes write actions, and from which the secure VM 356 executes read actions. The application executing unit 524 which presents messages, and executes an application such as Java (registered trademark) or HDMV or the like, writes a value corresponding to the content of notification to the secure VM 356, to the register Y (PSR-Y) 572.

Upon data being written to the register Y (PSR-Y) 572, a notification (INTRP: interrupt) is made to the secure VM 356. The secure VM 356 performs processing corresponding to the value written to the register Y (PSR-Y) 572. For example, user input values as to a message display which the application executing unit 524 has made is written to the register Y (PSR-Y) 572.

The register Z (PSR-Z) 573 is a register regarding which both the secure VM 356 and the application executing unit 524 can both write and read. The register Z (PSR-Z) 573 is used as a processing status notification register between the secure VM 356 and the application executing unit 524, mutually.

Figure 20:
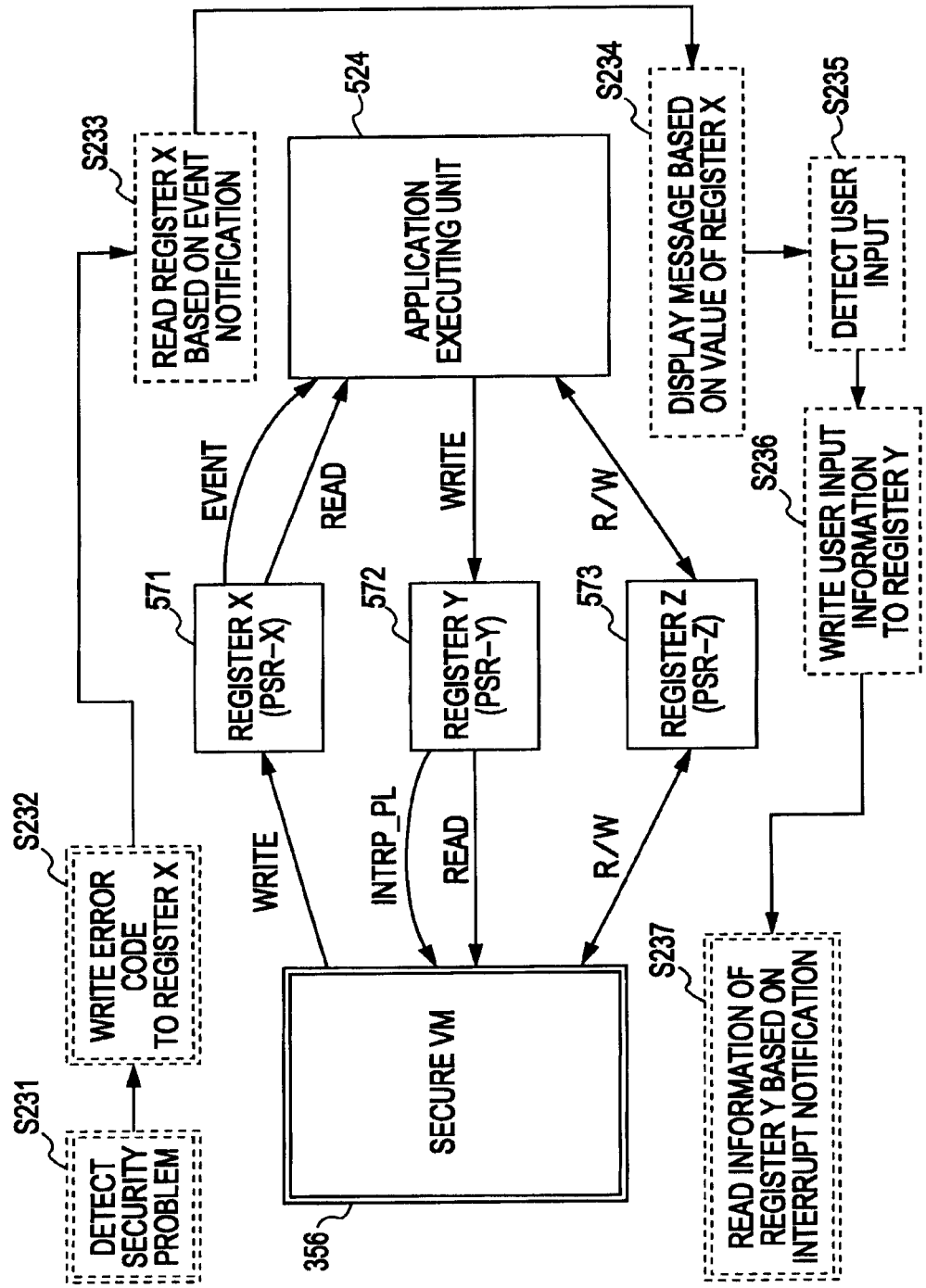
FIG. 20 is a diagram describing a data transfer processing sequence between the secure VM and application executing unit by using registers used by the application executing unit.

Message presentation and user input reception processing sequence using the present configuration will be described with reference to FIG. 20. FIG. 20 shows the secure VM 356 serving as the security information processing unit, the application executing unit 524, and the three registers, register X (PSR-X) 571, register Y (PSR-Y) 572, and register Z (PSR-Z) 573.

Applications normally executed at the application executing unit 524 are application programs for executing Java (registered trademark) or HDMV contents, for example, stored in the information recording medium. The processing sequence executed at the secure VM 356 and the application executing unit 524 is shown in FIG. 20 as the processing steps S231 through S237 in FIG. 20. The processing at each step will be described.

First, in step S231, let us say that the secure VM 356 detects some sort of security problem in the content reproduction processing. As described earlier with reference to FIG. 6 and other drawings, the secure VM 356 receives the monitoring information from the event handler 354, and in the event of detection of a processing error or unauthorized processing or the like, such information is input to the secure VM 356.

In the event that an error such as some sort of security program is detected in the content reproducing processing, the secure VM 356 writes an error code set corresponding to each error beforehand to the register X (PSR-X) 571 in step S232. Upon the write action to the register being performed, an event notification based on the change at the register X (PSR-X) 571 is made to the application executing unit 524, whereby the application executing unit 524 can know that a write action has been executed to the register X (PSR-X) 571.

In step S233, the application executing unit 524 detects the register writing due to the event notification and obtains the error code written to the register X (PSR-X) 571. Following obtaining of the error code written to the register X (PSR-X) 571, a message set corresponding to the obtained error code is output to the display unit in step S234.

The message data displayed at the display unit is, for example, display data or the like where a message and user input unit has been set, as described earlier with reference to FIG. 14. Upon detecting user input in step S235, the application executing unit 524 writes the user input information to the register Y (PSR-Y) 572 in step S236.

Upon data being written to the register Y (PSR-Y) 572, a notification (INTRP: interrupt) is made to the secure VM 356. Upon detecting the write action to the register Y (PSR-Y) 572 by way of the notification (INTRP: interrupt), in step S237 the secure VM 356 performs processing corresponding to the value written to the register Y (PSR-Y) 572, for example, obtains user input values as to a message display which the application executing unit 524 has made, and executes processing corresponding to the user input values.

While usage of the register Z (PSR-Z) 573 is not indicated in the above-described processing sequence, the register Z (PSR-Z) 573 is a register capable of writing and reading by both the secure VM 356 and application executing unit 524, and is used as a processing status notification register between the secure VM 356 and the application executing unit 524, mutually.

For example, the register Z (PSR-Z) 573 can be set to values according to how far both the secure VM 356 and application executing unit 524 have proceeded in the process, thereby allowing both to confirm how far each other have proceeded in the processing sequence, such as, for example, the register Z (PSR-Z) 573 is set to a value=0 in the initial state, and at the point that the secure VM 356 has completed processing and the application executing unit 524 is to perform the processing procedures the register Z (PSR-Z) 573 is set to a value=1, and then next, at the point that the application executing unit 524 has completed processing and the secure VM 356 is to perform the processing procedures the register Z (PSR-Z) 573 is set to a value=2, and so on. Also, at the time of ending or canceling processing, this reverts to the initial setting value=0 for the register Z (PSR-Z) 573.

Thus, the secure VM 356 and application executing unit 524 can perform accurate processing following the processing sequence by using the register Z (PSR-Z) 573 as a mutual processing status notification register between the secure VM 356 and application executing unit 524.

Further, reliability confirmation processing between the secure VM 356 and application executing unit 524 can be performed by the secure VM 356 and application executing unit 524 both using the available three registers, register X (PSR-X) 571, register Y (PSR-Y) 572, and register Z (PSR-Z) 573 shown in FIG. 19.

Figure 21:
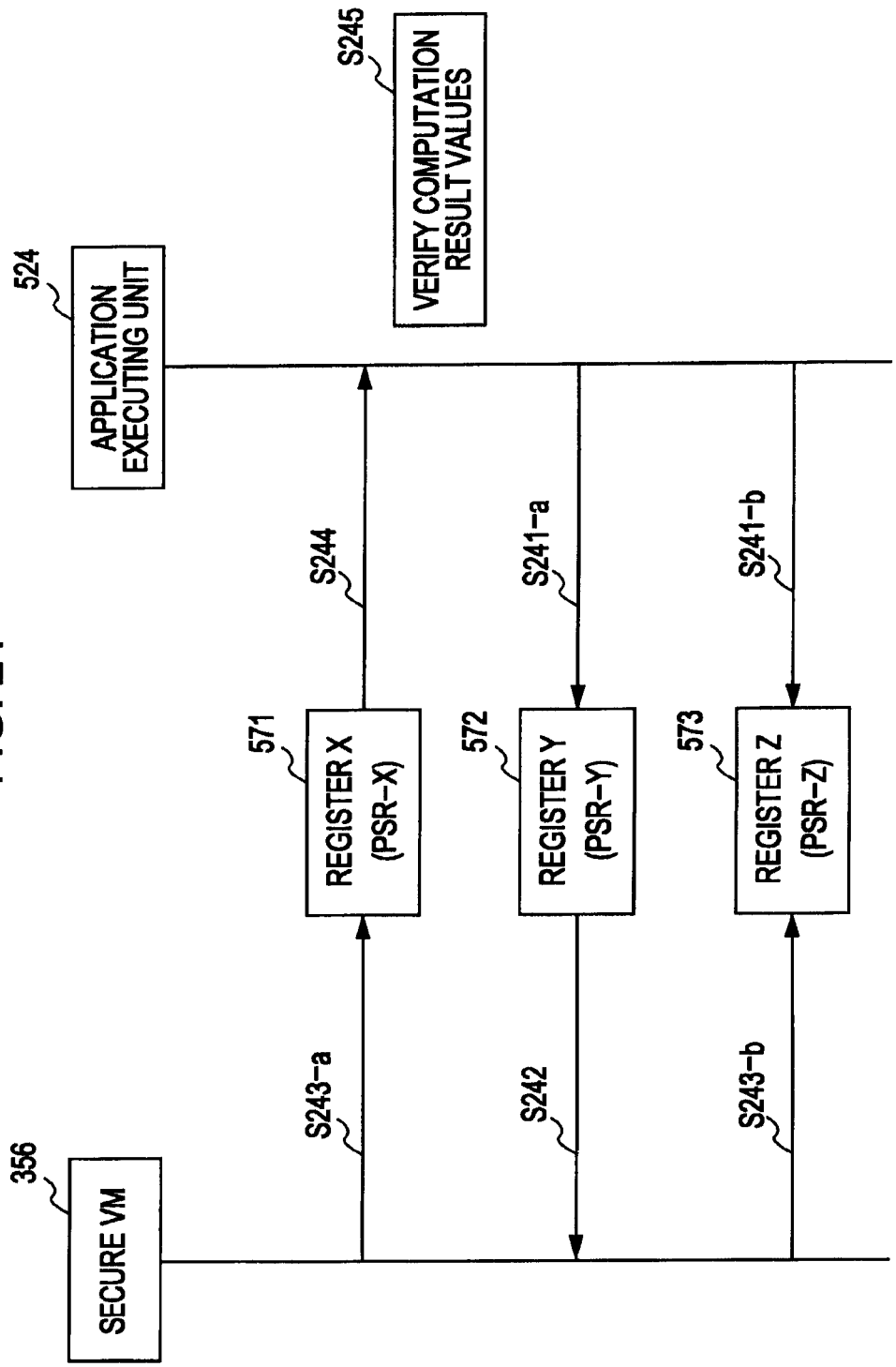
FIG. 21 is a diagram describing a reliability confirmation processing sequence executed between the secure VM and application executing unit.

The reliability confirmation processing sequence between the secure VM 356 and application executing unit 524 will be described with reference to FIG. 21. FIG. 21 is a diagram describing the processing sequence for the secure VM 356 and application executing unit 524 to carry out challenge/response processing, thereby confirming that each other is operating properly. The steps will be described.

First, in step S241-*a*, the application executing unit 524 generates a suitable value (e.g., a random number) and writes this to the register Y (PSR-Y) 572. Further, in step S241-*b*, a status value (e.g., 2) is written to the register Z (PSR-Z) 573.

The secure VM 356 detects that data has been written to the register Y (PSR-Y) 572 by notification (INTRP_PresentationLayer), and in step S242, reads the data written to the register Y (PSR-Y) 572.

Further, the secure VM 356 executes predetermined data processing, such as computation processing or encryption processing for example, on the value (random number) read from the register Y (PSR-Y) 572, and in step S243-*a*, writes the resultant value to the register X (PSR-X) 571. In step S243-*b*, the secure VM 356 writes the status value (e.g., 1) to the register Z (PSR-Z) 573.

In step S244, the application executing unit 524 reads the data written to the register X (PSR-X) 571, and in step S245, executes verification of the read data. For example, application executing unit 524 makes a comparison cross-check with the results of computation or encryption performed by itself based on the random number generated by the application executing unit 524 and notified to the secure VM 356, and in the event that this matches the value read from the register X (PSR-X) 571, determination is made that the secure VM 356 is a secure VM 356 executing proper processing. Note that the computation processing or encryption processing which the application executing unit 524 secure VM 356 perform with regard to the random number is preferably processing based on shared secret information.

Arrangements may be made wherein the reliability confirmation processing shown in FIG. 21 is repeatedly performed multiple times, or wherein the secure VM 356 issues the random number. Having this reliability confirmation function enables reliability confirmation to be made regarding applications executed at the application executing unit 524, so the point that configuration as it has been in the past will suffice without providing any particular restrictions on the robustness of the application layer (AV layer) is an extremely great advantage.

Applications executed at the AV layer serving as the application executing unit 524 are often processed by a normal CPU, meaning that implementation is very costly in the event that high-level robustness is required, but enabling reliability confirmation between the secure VM 356 and application executing unit 524 as with the present processing example enable settings wherein high robustness is not required of applications to be executed at the application executing unit 524.

(4.2.5) Processing Example 2 Employing Registers Used by Application Executing Unit Next, another configuration example enabling a part of the registers used by the application executing unit to be read/write enabled for use by the secure VM 356 serving as the security information processing unit, will be described with reference to FIG. 22. The present processing example also has a configuration enabling message presenting and user input reception, and further enabling reliability confirmation processing between the secure VM 356 and application execution unit.

Figure 22:
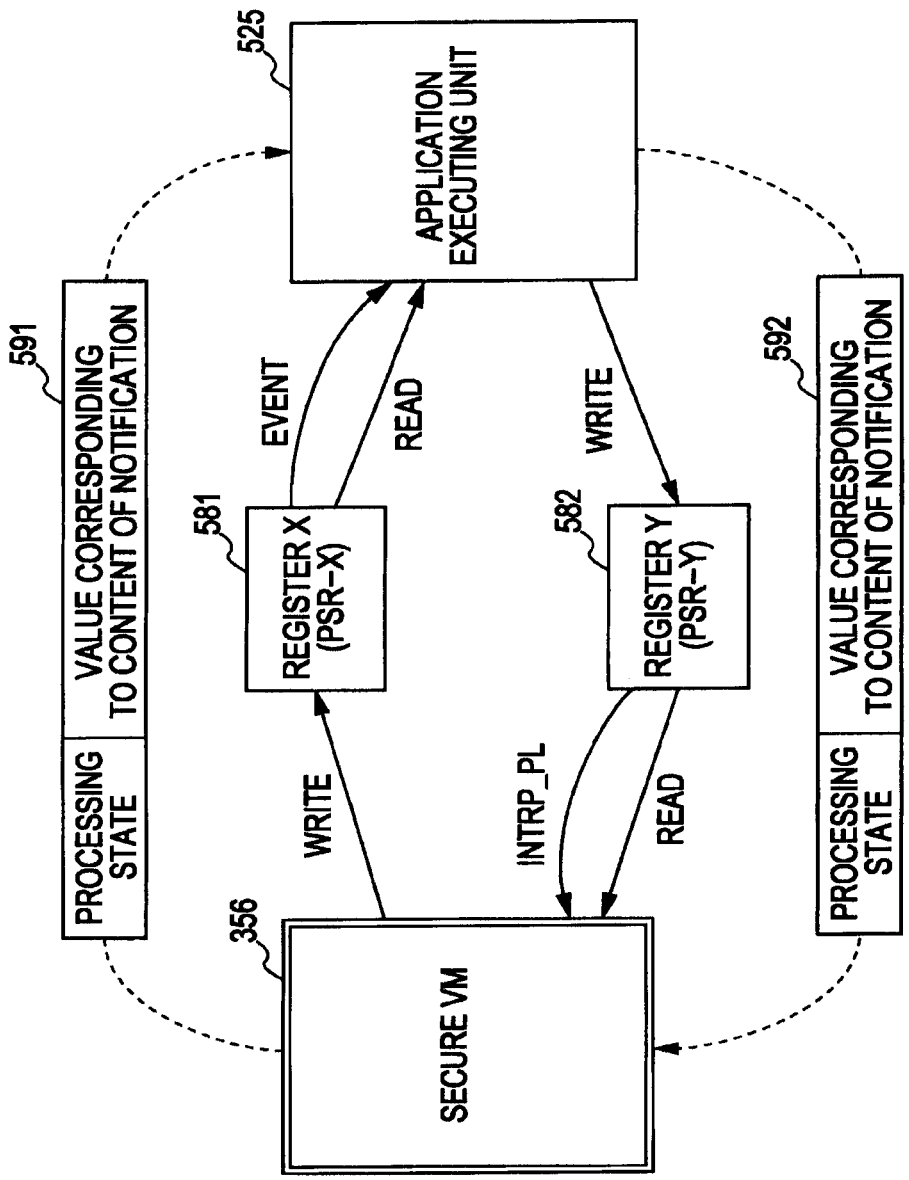
FIG. 22 is a diagram describing a configuration example for data transfer between the secure VM and application executing unit by using registers used by the application executing unit.

FIG. 22 shows the secure VM 356 serving as the security information processing unit, an application executing unit 525 set at the AV-Layer for example, and two registers, register X (PSR-X) 581 and register Y (PSR-Y) 582. This configuration is a configuration wherein the register Z (PSR-Z) has been omitted from the configuration described earlier with reference to FIG. 19.

The register X (PSR-X) 581 is a register where the secure VM 356 executes write and the application executing unit 525 executes read. Upon the secure VM 356 executing a write action to the register X (PSR-X) 581, an event notification based on the change at the register X (PSR-X) 581 is made to the application executing unit 525, whereby the application executing unit 525 can know that a write action has been executed to the register X (PSR-X) 581.

The application executing unit 525 which, for example, presents messages, and executes Java (registered trademark) or HDMV applications, checks the register X (PSR-X) 581 as soon as it receives the notification that a write action has been executed to the register X (PSR-X) 581, and performs processing such as displaying a warning message in response to the value.

Also, the register Y (PSR-Y) 582 is a register to which the application executing unit 525 executes write actions, and from which the secure VM 356 executes read actions. The application executing unit 525 which presents messages, and executes Java (registered trademark) or HDMV applications, writes a value corresponding to the content of notification to the secure VM 356, to the register Y (PSR-Y) 582.

Upon data being written to the register Y (PSR-Y) 582, a notification (INTRP: interrupt) is made to the secure VM 356. The secure VM 356 performs processing corresponding to the value written to the register Y (PSR-Y) 582. For example, user input values as to a message display which the application executing unit 525 has made is written to the register Y (PSR-Y) 582.

With the present configuration, the register Z previously described with reference to FIG. 19, i.e., the register for mutual processing status notification between the secure VM 356 and the application executing unit 525, is not set. With the present processing example, write values to the register X (PSR-X) 581 and the register Y (PSR-Y) 582 are used for status notification between the secure VM 356 and the application executing unit 525.

As shown in the drawing, at the time of the secure VM 356 executing a write action to the register X (PSR-X) 581 at which the secure VM 356 performs write actions and the application executing unit 525 performs read actions, the secure VM 356 executes processing for writing a processing status bit other than the value corresponding to the notification contents, to the register X (PSR-X) 581, such as the register write data 591. The application executing unit 525 can know the processing status by reading this processing status bit.

As shown in the drawing, at the time of the application executing unit 525 executing a write action to the register Y (PSR-Y) 582 at which the application executing unit 525 performs write actions and the secure VM 356 performs read actions, the application executing unit 525 executes processing for writing a processing status bit other than the value corresponding to the notification contents, to the register Y (PSR-Y) 582, such as register write data 592. The secure VM 356525 can know the processing status by reading this processing status bit.

Thus, with the present configuration, processing status, bits are written along at the time of writing data to the register X (PSR-X) 581 and the register Y (PSR-Y) 582, thereby realizing mutual processing status notification between the secure VM 356 and the application executing unit 524.

Figure 23:
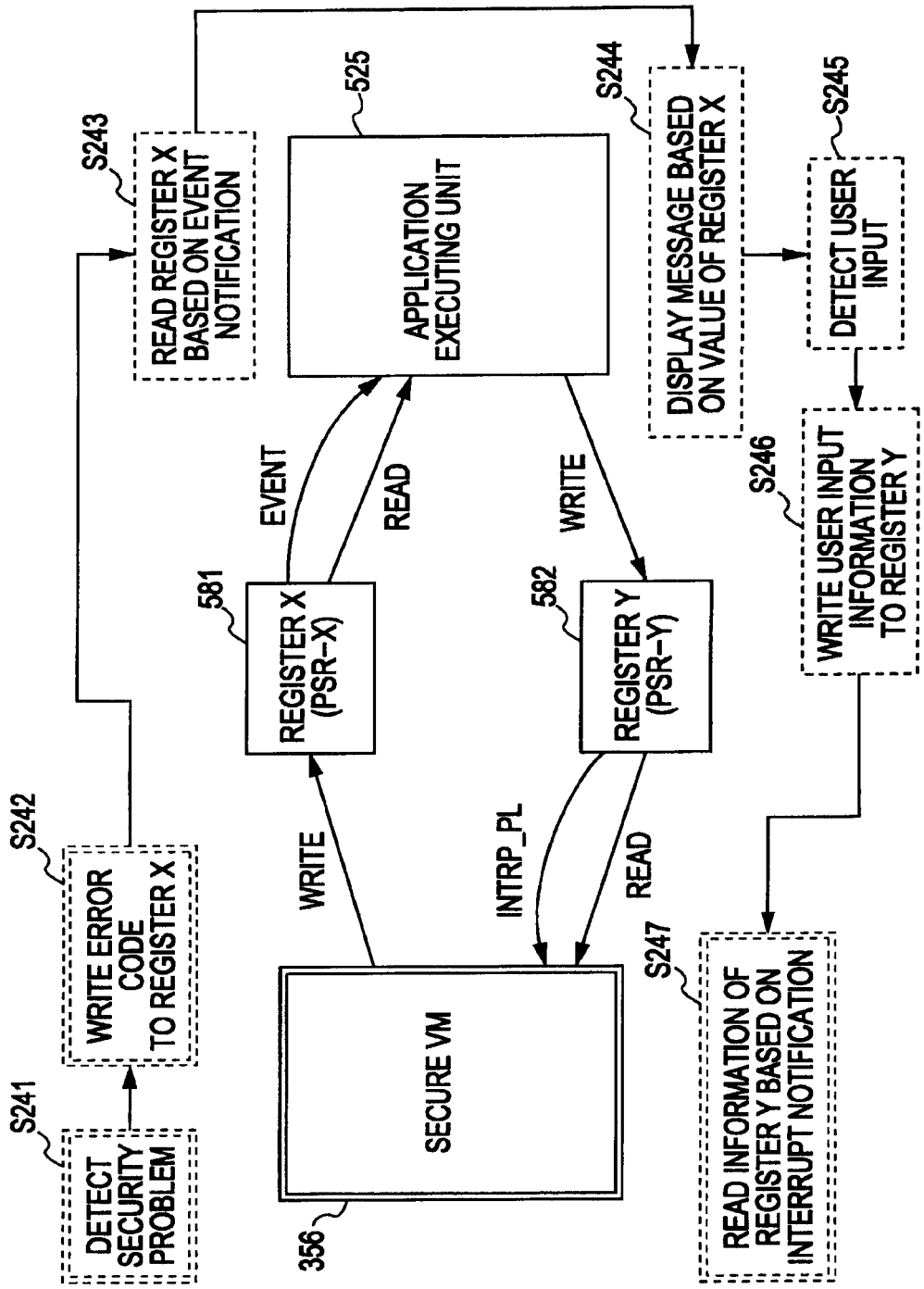
FIG. 23 is a diagram describing a data transfer processing sequence between the secure VM and application executing unit by using registers used by the application executing unit.

Message presentation and user input reception processing sequence using the present configuration will be described with reference to FIG. 23. FIG. 23 shows the secure VM 356 serving as the security information processing unit, the application executing unit 525, and the two registers, register X (PSR-X) 581 and register Y (PSR-Y) 582.

Applications normally executed at the application executing unit 525 are application programs for executing Java (registered trademark) or HDMV contents, for example, stored in the information recording medium. The processing sequence executed at the secure VM 356 and the application executing unit 525 is shown as the processing steps S241 through S247 in FIG. 23. The processing at each step will be described.

First, in step S241, let us say that the secure VM 356 detects some sort of security problem in the content reproduction processing. As described earlier with reference to FIG. 6 and other drawings, the secure VM 356 receives the monitoring information from the event handler 354, and in the event of detection of a processing error or unauthorized processing or the like, such information is input to the secure VM 356.

In the event that an error such as some sort of security program is detected in the content reproducing processing, the secure VM 356 writes an error code set corresponding to each error beforehand to the register X (PSR-X) 581 in step S242. At the time of writing the data to the register X (PSR-X) 581, a predetermined status notification bit is also written together.

Due to the write action to the register being performed, an event notification based on the change at the register X (PSR-X) 581 is made to the application executing unit 525, whereby the application executing unit 525 can know that a write action has been executed to the register X (PSR-X) 581.

In step S243, the application executing unit 525 detects the register writing by the event notification and obtains the error code and the status notification bit written to the register X (PSR-X) 581. Following obtaining of the error code written to the register X (PSR-X) 581, the application executing unit 525 outputs a message set corresponding to the obtained error code to the display unit in step S244.

The message data displayed at the display unit is, for example, display data or the like where a message and user input unit has been set, as described earlier with reference to FIG. 14. Upon detecting user input in step S245, the application executing unit 525 writes the user input information to the register Y (PSR-Y) 582 in step S246. At the time of writing data to the register Y (PSR-Y) 582, a predetermined status notification bit is also written together.

Upon data being written to the register Y (PSR-Y) 582, a notification (INTRP: interrupt) is made to the secure VM 356. Upon detecting the write action to the register Y (PSR-Y) 582 by way of the notification (INTRP: interrupt), in step S247 the secure VM 356 performs processing corresponding to the value written to the register Y (PSR-Y) 582, for example, user input values as to a message display which the application executing unit 524 has made are obtained, and processing corresponding to the user input values is executed. At this point, the secure VM 356 also reads the status notification bit written by the secure VM 356 to the register Y (PSR-Y) 582, and confirms the processing status.

The status bits to be written to the registers may be according to the same setting arrangement as with the example of the setting values for the PSR-Z described earlier with reference to FIG. 20. For example, a value=0 is set in the initial state, and at the point that the secure VM 356 has completed processing and the application executing unit 525 is to perform the processing procedures, a value=1 is set, and then next, at the point that the application executing unit 525 has completed processing and the secure VM 356 is to perform the processing procedures, a value=2 is set, and so on, so as to be set to values according to how far both the secure VM 356 and application executing unit 525 have proceeded in the process. Also, at the time of ending or canceling processing, this reverts to the initial setting value=0.

Thus, the secure VM 356 and application executing unit 525 can perform accurate processing following the processing sequence by using the register X (PSR-X) 581 and the register Y (PSR-Y) 582 for mutual processing status notification.

Further, reliability confirmation processing between the secure VM 356 and application executing unit 525 can be performed by the secure VM 356 and application executing unit 525 both using the available register X (PSR-X) 581 and register Y (PSR-Y) 582.

Figure 24:
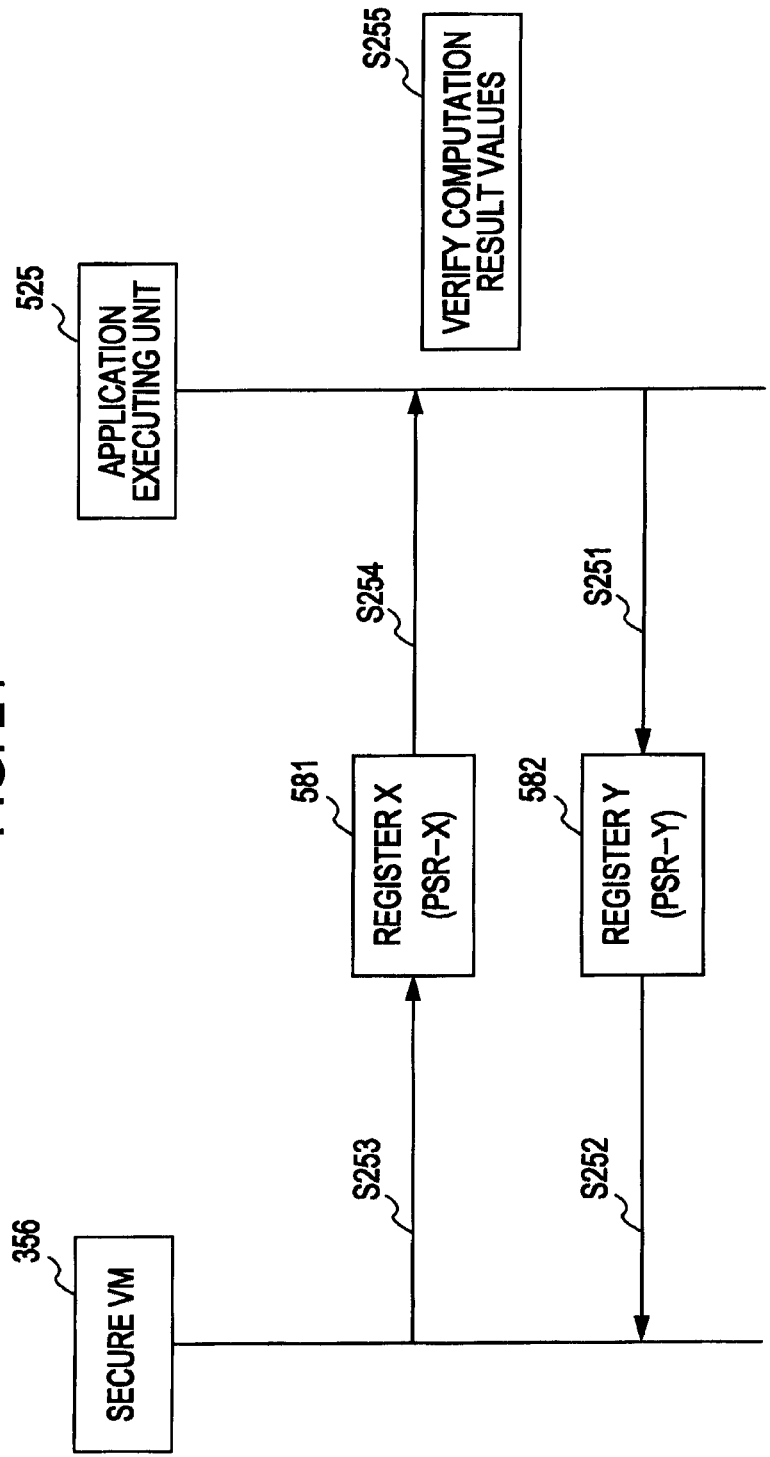
FIG. 24 is a diagram describing a reliability confirmation processing sequence executed between the secure VM and application executing unit.

The reliability confirmation processing sequence between the secure VM 356 and application executing unit 525 will be described with reference to FIG. 24. FIG. 24 is a diagram describing the processing sequence for the secure VM 356 and application executing unit 525 to carry out challenge/response processing, thereby confirming that each other is operating properly. The steps will be described.

First, in step S251, the application executing unit 525 generates a suitable value (e.g., a random number) and writes this to the register Y (PSR-Y) 582. At this time, the application executing unit 525 also writes a status bit indicating the processing status to the register Y (PSR-Y) 582.

The secure VM 356 detects that data has been written to the register Y (PSR-Y) 582 by notification (INTRP_PresentationLayer), and in step S252, reads the data written to the register Y (PSR-Y) 582. At this time of reading, the status bit is also read, and the processing status is confirmed.

Further, the secure VM 356 executes predetermined data processing, such as computation processing or encryption processing for example, on the value (random number) read from the register Y (PSR-Y) 582, and in step S253, writes the resultant value to the register X (PSR-X) 581. At the time of this processing, the secure VM 356 also writes a status bit indicating the processing status to the to the register X (PSR-X) 581.

In step S254, the application executing unit 525 reads the data written to the register X (PSR-X) 581. At this time of reading, the status bit is also read, and the processing status is confirmed.

Next, in step S255, the application executing unit 525 executes verification of the read data. For example, the application executing unit 525 makes a comparison cross-check with the results of computation or encryption performed by itself based on the random number generated by the application executing unit 525 and notified to the secure VM 356, and in the event that this matches the value read from the register X (PSR-X) 581, determination is made that the secure VM 356 is a secure VM 356 executing proper processing. Note that the computation processing or encryption processing which the application executing unit and 525 secure VM 356 perform with regard to the random number is preferably processing based on shared secret information.

Arrangements may be made wherein the reliability confirmation processing shown in FIG. 24 is repeatedly performed multiple times, or wherein the secure VM 356 issues the random number. Having this reliability confirmation function enables reliability confirmation to be made regarding applications executed at the application executing unit 525, as with (4.2.4) Processing Example 1 Employing Registers Used by Application Executing Unit, described earlier, so the point that configuration as it has been in the past will suffice without providing any particular restrictions on the robustness of the application layer (AV layer) is an extremely great advantage.

(4.3) Message Display and Content Usage Control Using Shared Memory Space

Next description will be made regarding message display and content usage control using shared memory space.

Figure 25:
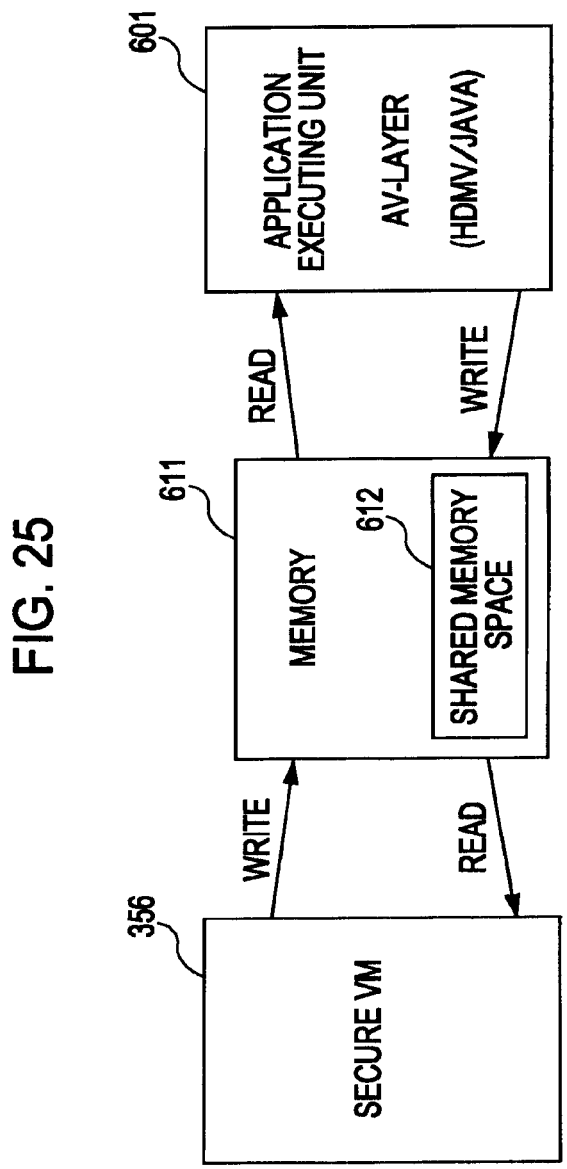
FIG. 25 is a diagram describing the basic configuration for realizing message display processing, and further, content usage control processing, using shared memory space.

FIG. 25 illustrates a basic configuration for realizing message display, and further, content usage control, using shared memory space. The secure VM 356 shown in FIG. 25 is the same secure VM 356 as the secure VM 356 described with reference to FIGS. 6, 10, and 11. That is to say, this is the secure VM 356 set in the host for executing the data transformation processing as a virtual machine, serving as a security information processing unit.

The secure VM 356 serving as a security information processing unit performs processing for reading the data transformation processing program 315 including command code information from the information recording medium 310 and executing the same, as described with reference to FIG. 6 and other drawings. Further, the secure VM 356 inputs the ID information of the player (information processing device) executing the host application as player information 355, and inputs monitoring information from the event handler 354.

The event handler 354 performs emulator checking regarding whether or not processing performed by the secure VM 356 is being performed properly, and the processing and status of other host applications and players (information processing devices) serving as host application execution equipment, is monitored, and in the event that a processing error or unauthorized processing or the like is detected, the data transformation processing by the secure VM 356 is cancelled.

With the present processing example, memory space 612 to be shared between the secure VM 356 serving as a security information processing unit and the application executing unit 601 is set in memory 611, with messages, commands, parameters, data, etc., being transferred therebetween using the shared memory space 612. Applications executed at the application executing unit 601 are application programs for executing various types of data processing, and are various application programs executed at the information processing device such as a PC or the like for executing content reproduction processing by the host 350 described with reference to FIGS. 6, 10, and 11.

For example, the application programs are the UI function providing program for providing UI functions so as to display various types of messages and to receive user input, as described earlier, application programs for executing Java (registered trademark) or HDMV contents stored in the information recording medium, and so forth. Note that these application programs may be either programs which the information processing device has stored in a hard disk or the like beforehand, or programs read out from an information recording medium.

The shared memory space 612 shown in FIG. 25 is used as space wherein both the secure VM 356 and the application executing unit 601 can write to and read from. Accordingly, the same processing as the various types of processing described with reference to FIGS. 15 through 24 can be realized using the memory space instead of registers. That is to say, the following types of processing which have been described as register application processing:

(a) UI function providing application using registers, described with reference to FIG. 16

(b) UI function providing by usage of registers and title switchover, described with reference to FIG. 17

(c) content usage control processing by usage of registers, described with reference to FIG. 18

(d) register usage processing described with reference to FIGS. 19 through 24 are realized by transferring messages, commands, parameters, data, etc., between the secure VM 356 and the application executing unit 601, via the shared memory space 612.

Using the memory space as a data writing region is advantageous in that the writing data size can be made larger than with cases of using registers, widening the range of application. For example, the secure VM 356 can provide data generated thereby to the application executing unit 601 by writing the data to the shared memory, and conversely, processing for the application executing unit 601 to hand generated data to the secure VM 356 is easily realized, and further, cooperative data processing between the processing of the secure VM 356 and the processing of the application executing unit 601 can also be realized.

(4.4) About the Authoring Process

In order to realize a configuration wherein data and parameter input/output is performed between the secure VM and the application using the registers or memory space described above, the application executed at the application layer preferably performs authoring, as a program with a processing routine for executing periodic register reference or memory reference processing set therein beforehand.

In the case of the configuration described with reference to FIG. 17 wherein title changing by the secure VM is permitted, a program wherein an application having the title specified by the secure VM executing periodic register referencing or memory referencing is sufficient, but with a configuration wherein title changing by the secure VM is not permitted, it becomes necessary for basically all applications executed at the application layer to perform authoring, as programs with a processing routine for executing periodic register reference or memory reference processing set therein beforehand.

As described above, programs executed at the application layer are application programs for executing Java (registered trademark) or HDMV contents stored in the information recording medium, for example, and performing authoring regarding these contents, so as to be programs with a processing routine for executing periodic register reference or memory reference processing set therein beforehand, enables the above processing.

Figure 26:
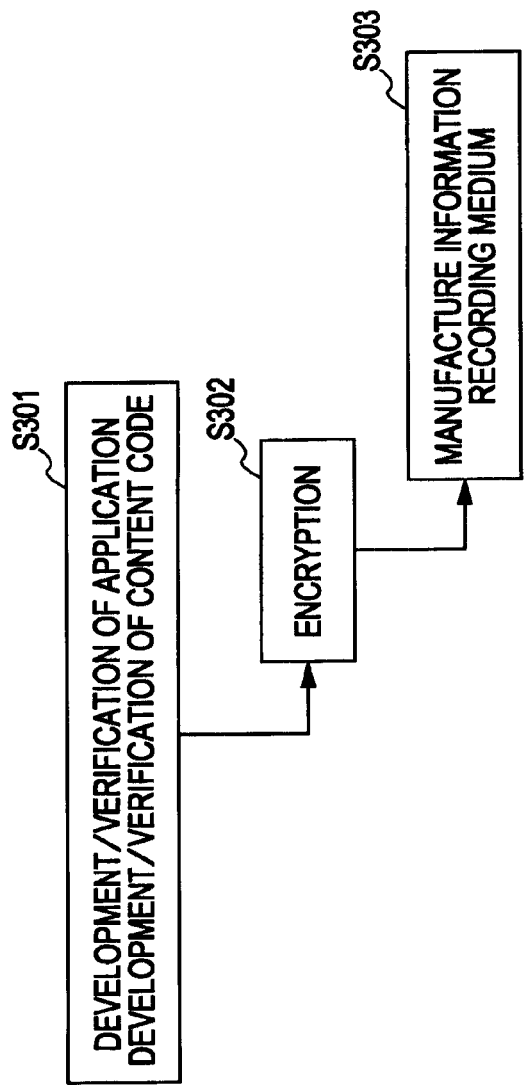
FIG. 26 is a diagram describing the content authoring process and information recording medium manufacturing process.

The authoring process of these contents and the information recording medium manufacturing process will be described with reference to FIGS. 26 and 27. FIG. 26 is a diagram describing the content authoring process in a case wherein title switchover by the secure VM is not permitted.

An application is generated as an application program serving as Java (registered trademark) or HDMV content that is executed at the application layer, and content including content code serving as command code information for the secure VM to read and execute. Step S301 is the development/verification process of this application and content code.

The application generated in this step S301 is authored as a program with a processing routine for executing periodic register reference or memory reference processing set therein beforehand. Also, the content code is set containing command code defining execution of message output by the secure VM and periodic parameter output.

In step S302, the application and content code generated in this step S301 is subjected to encryption if necessary, and then written to a disk in step S303 to manufacture a disk. The disk manufacturing process of step S303 includes manufacturing of a master disk and a stamper process.

According to these processes, the contents recorded in the information recording medium are contents including code information executed by an application program and virtual machine, with the application program being set as a program containing a processing routine for executing periodic register reference or memory reference processing, and the code information is configured as information containing execution commands of processing for writing error codes obtained as the result of security checks to a register or memory.

Such contents stored in the information recording medium are contents capable of executing the various types of processing described with reference to FIGS. 15 through 25.

Figure 27:
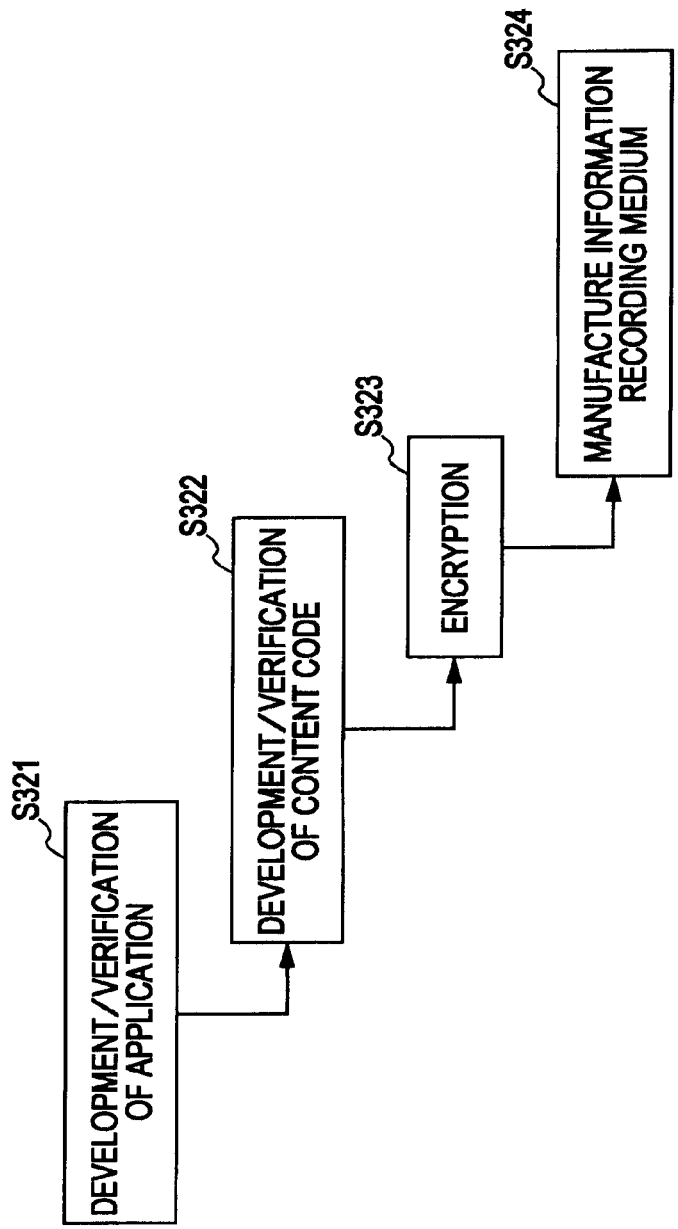
FIG. 27 is a diagram describing the content authoring process and information recording medium manufacturing process.

FIG. 27 illustrates the content authoring process in a case wherein title switchover by the secure VM is permitted. In the case of the configuration described with reference to FIG. 17 wherein title changing by the secure VM is permitted, a program wherein only an application having the title specified by the secure VM executing periodic register referencing or memory referencing is sufficient.

Accordingly, with normal applications, there is no need to be set as a program containing a processing routine for executing periodic register referencing or memory referencing, and applications can be developed freely. Setting just certain application as programs containing a processing routine for executing periodic register referencing or memory referencing is sufficient.

As shown in FIG. 27, the application development/verification process in step S321 and the content code development/verification process in step S322 are separated, so that the application development/verification process can be freely developed without being concerned of the content code. Only the application which is the target of title switchover by the secure VM needs to be authored according to the process shown in FIG. 26.

With the process in FIG. 27, the content code development/verification process in step S322 can be performed following the application development/verification process in step S321. Subsequently, in step S323, encryption is performed if necessary, and then written to a disk in step S324 to manufacture a disk. The disk manufacturing process of step S324 includes manufacturing of a master disk and a stamper process.

The application development/verification process and the content code development/verification process are separate for operational reasons, so for practical purposes a configuration following the process shown in FIG. 27 is preferable, and by setting just certain application as programs containing a processing routine for executing periodic register referencing or memory referencing in a configuration permitting title switchover by the secure VM allows other normal applications to be freely developed.

5. Configuration of Information Processing Device

Figure 28:
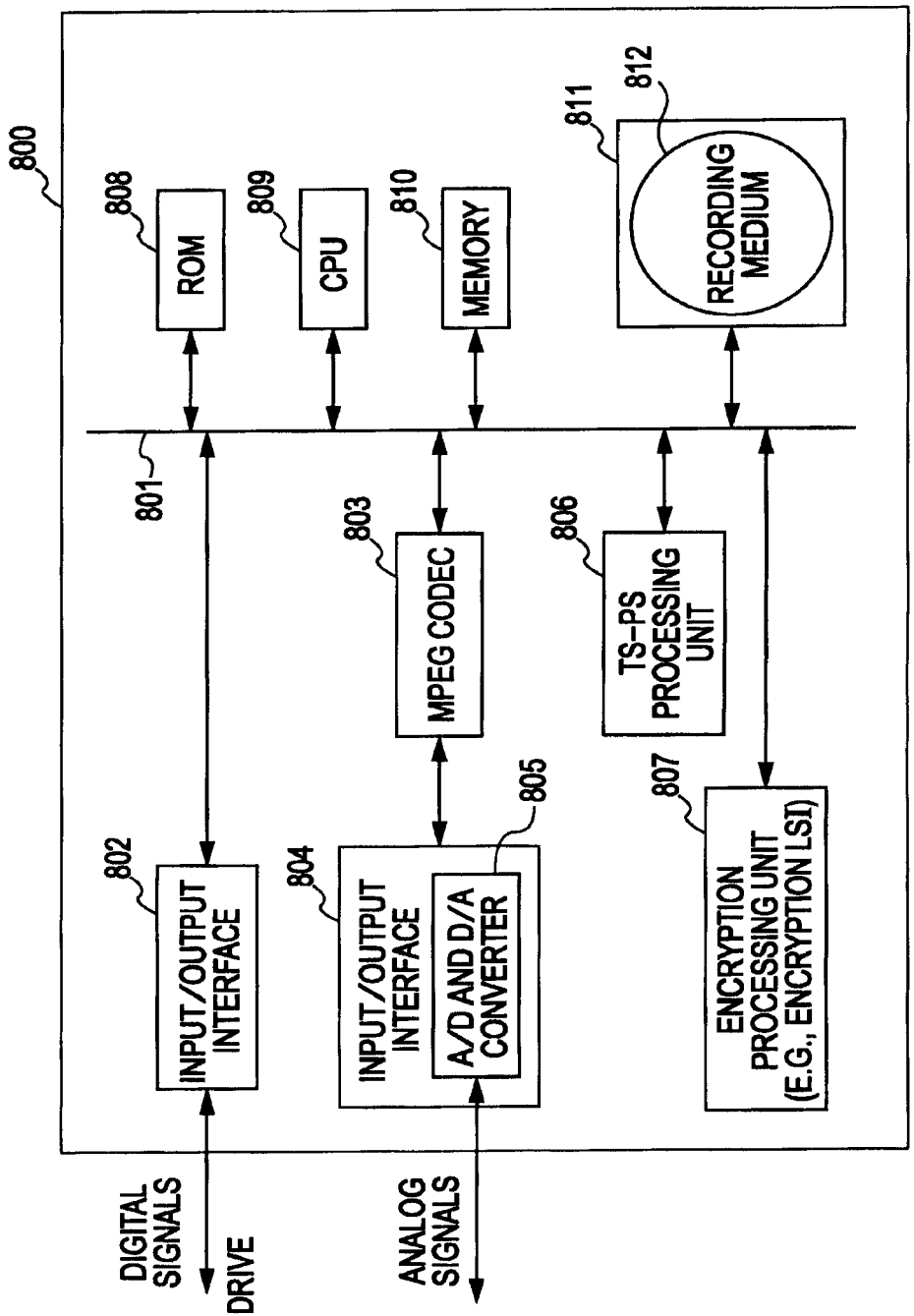
FIG. 28 is a diagram describing a hardware configuration example of an information processing device for executing applications as a host.

Next, the hardware configuration example of an information processing device which executes applications as a host will be described with reference to FIG. 28. An information processing device 800 has the CPU 809 which executes data processing following various types of programs such as OS, content reproduction and recording application programs, and programs for mutual authentication processing, and so forth, ROM 880 serving as a storage area for programs, parameters, etc., memory 810, and input/output I/F 802 for input/output of digital signals, an input/output I/F 804 having an A/D, D/A converter 805 for input/output of analog signals, an MPEG CODEC 803 for executing encoding and decoding processing of MPEG data, a TS-PS processing unit 806 for executing the TS (Transport stream)-PS (Program Stream) processing, an encryption processing unit 807 for executing the various types of encryption processing, such as mutual authentication decryption processing of encrypted content, and so forth, a recording medium 812 such as a hard disk, and a drive 811 for driving the recording medium 812 and performing input/output of data recording/reproducing signals, with each block being connected to a bus 801.

The information processing device (host) 800 is connected with the drive by connecting bus such as a ATAPI-BUS, for example. Fix-up tables, content, and so forth, are input/output via the digital signal input/output I/F 802. Encryption processing and decryption processing is performed by the encryption processing unit 807, applying AES algorithms, or the like, for example.

Note that programs for executing content reproduction or recording processing are kept inside the ROM 808 for example, and the memory 810 is used while executing the programs if necessary, for work area for keeping the parameters and data.

The ROM 808 or recording medium 812 stores, for example, the public key of an Administration Center, a secret key for a host, a public key certificate for the host, and further, a drive CRL serving as a revocation list, and so forth.

Various message displays are executed at the time of content reproduction processing, based on the security check information which the above-described secure VM 356 has obtained.

The present invention has been described in detail so far with reference to specific embodiments. However, it is self-evident that one skilled in the art can make modifications and substitutions to the embodiments without departing from the essence of the present invention. That is to say, the present invention has been disclosed in exemplary form, and should not be interpreted restrictively. The judgment of the essence of the present invention should be made with reference to the Claims section.

Note that the series of processing described in the Specification can be carried out by hardware, software, or a combination of both. In the case of executing the processing with software, a program recording the processing sequence can either be installed in the memory within a computer that has built-in dedicated hardware and executed, or the program can be installed in a general-purpose computer capable of executing various types of processing.

For example, the program may be recorded in a hard disk or ROM (Read Only Memory) serving as recording media beforehand. Or, this may be temporarily or permanently stored (recorded) in removable media such as a flexible disk, CD-ROM (Compact Disc Read Only Memory), MO (Magneto optical) disk, DVD (Digital Versatile Disc), magnetic disk, semiconductor memory, etc. Such removable recording media can be provided as so-called packaged software.

Note that besides installing the program from removable recording media such as described above to the computer, the program may be wirelessly transferred to the computer from the download site, or transferred to the computer over cable networks such as a LAN (Local Area Network) or the Internet, with a computer receiving the program transferred in such a way, so as to be installed in a built-in recording medium such as a hard disk or the like.

Also, the various types of processing described in the Specification are not restricted to execution in the time-sequence described, and may be executed in parallel or independently, depending on the processing capabilities of the device executing the processing. Also note that system as used in the present Specification is a logical collection of multiple devices, and is not restricted to the devices of each configuration being within a single housing.

What is claimed is:

1. An information processing device for executing content reproduction processing from an information recording medium, comprising:
    a security information processing means for determining an output message based on security check information in a content reproduction sequence, and for outputting an output message to an application executing device;
    an application executing means for obtaining the output message from the security information processing means;
    a first register configured to receive data written from the security information processing means and provide data read by the application executing means;
    a second register configured to receive data written from the application executing means and provide data read by the security information processing means; and
    a third register configured to receive and provide processing status data which is both written and read by both the security information processing means and the application executing means, wherein
    a write notification is made to the security information processing means when the data is written at the second register,
    the first register is a register to which the security information processing means executes write actions and from which the application executing means executes read actions,
    the second register is a register to which the application executing means executes write actions and from which the security information processing means executes read actions, and
    the third register is a register in which both the security information processing means and the application executing means execute write and read actions,
    the application executing means, the security information processing means, and the first and second registers are configured such that:
    the security information processing means does not execute a write action to the second register and does not execute a read action from the first register, and
    the application executing means does not execute a write action to the first register and does not execute a read action from the second register.

2. The information processing device according to claim 1, wherein:
    upon detecting, by the security information processing means, a security problem in the content reproduction processing from the information recording medium, the security information processing means executes a first write action to write an error code to the first register, which causes an event notification based on the first write action to be made to the application executing means to inform the application executing means the first write action has been executed to the first register, and
    upon being informed of the first write action having been executed to the first register, the application executing means obtains the error code from the first register and outputs a message set corresponding to the obtained error code.

3. The information processing device according to claim 2, wherein:
    upon detecting a user input responding to the message set, the application executing means executes a second write action to write the user input to the second register, which causes an event notification based on the second write action to be made to the security information processing means to inform the security information processing means the second write action has been executed to the second register, and
    upon being informed of the second write action having been executed to the second register, the security information processing means performs processing according to the second write action.

4. The information processing device according to claim 3, wherein:
    upon being informed of the second write action having been executed to the second register, the security information processing means obtains user input values responding to the message set and executes processing corresponding to the user input values.

5. The information processing device according to claim 4, wherein:
    the third register is set to values according to a progress of the security information processing means and the application executing means in executing respective write and read actions, and the third register is reset to an initial setting value when the processing of the security information processing means and the application executing means are canceled or ended.

6. The information processing device according to claim 1, wherein the application executing unit and the security information processing means are configured to execute a reliability confirmation processing, including:
   generating verification data and writing, by the application executing means, the verification data to the second register,
   upon writing the verification data to the second register, writing a status value to the third register,
   the security information processing means detecting the verification data being written to the second register, reading the verification data, executing predetermined processing on the verification data to generate resultant data, and writing the resultant data to the first register,
   upon writing the resultant data to the first register, updating the status value in the third register, and
   the application executing means detecting the resultant data being written to the first register, reading the resultant data, and executing verification of the resultant data by executing the predetermined processing on the verification data and comparing a result thereof with the resultant data.

7. The information processing device according to claim 6, wherein the verification data is a random number.

8. The information processing device according to claim 6, wherein the verification data is based on shared secret information.

9. The information processing device according to claim 6, wherein the predetermined processing is encryption processing or computation processing.

10. The information processing device according to claim 1, wherein:
   upon the security information processing means executing a first write action to the first register, an event notification based on the first write action is made to the application executing means to inform the application executing means the first write action has been executed to the first register.

11. The information processing device according to claim 1, wherein:
   upon the application executing means executing a second write action to the second register, an event notification based on the second write action is made to the security information processing means, which performs processing according to the second write action.

12. The information processing device according to claim 1, wherein the third register is a processing status notification register between the security information processing means and the application executing means.

13. The information processing device according to claim 1, wherein the application executing means is configured to execute application programs for executing Java or HDMV (high definition movie mode) contents stored in the information recording medium.

14. An information processing method for executing content reproduction processing from an information recording medium, the method comprising:
   determining, by a security information processing device, an output message based on security check information in a content reproduction sequence;
   outputting an output message to an application executing device configured to obtain the output message from the security information processing device;
   receiving, at a first register, data written from the security information processing device;
   providing, from the first register, data to the application executing device;
   receiving, at a second register, data written from the application executing device;
   providing, from the second register, data to the security information processing device; and
   receiving and providing, via a third register, processing status data which is both written and read by both the security information processing device and the application executing device, wherein
   a write notification is made to the security information processing device when the data is written at the second register,
   the first register is a register to which the security information processing device executes write actions and from which the application executing device executes read actions,
   the second register is a register to which the application executing device executes write actions and from which the security information processing device executes read actions,
   the third register is a register in which both the security information processing device and the application executing device execute write and read actions, and
   the application executing device, the security information processing device, and the first and second registers are configured such that:
   the security information processing device does not execute a write action to the second register and does not execute a read action from the first register, and
   the application executing device does not execute a write action to the first register and does not execute a read action from the second register.

15. A non-transitory computer-readable medium storing instructions, which when executed by an information processing device, causes the information processing device to perform a process for executing content reproduction processing from an information recording medium, the process comprising:
   determining, by a security information processing device, an output message based on security check information in a content reproduction sequence;
   outputting an output message to an application executing device configured to obtain the output message from the security information processing device;
   receiving, at a first register, data written from the security information processing device;
   providing, from the first register, data to the application executing device;
   receiving, at a second register, data written from the application executing device;
   providing, from the second register, data to the security information processing device; and
   receiving and providing, via a third register, processing status data which is both written and read by both the security information processing device and the application executing device, wherein
   a write notification is made to the security information processing device when the data is written at the second register,
   the first register is a register to which the security information processing device executes write actions and from which the application executing device executes read actions, the second register is a register to which the application executing device executes write actions and from which the security information processing device executes read actions, the third register is a register in which both the security information processing device and the application executing device execute write and read actions, and the application executing device, the security information processing device, and the first and second registers are configured such that:

the security information processing device does not execute a write action to the second register and does not execute a read action from the first register, and the application executing device does not execute a write action to the first register and does not execute a read action from the second register.

16. The information processing device according to claim 1, wherein the first, second and third registers are processor registers.

17. The information processing device according to claim 1, wherein:

the write notification is an interrupt that is transmitted to the security information processing device by the second register in response to the data being written to the second register.

* * * * *